(12) United States Patent
Pasta et al.

(10) Patent No.: US 9,029,015 B2
(45) Date of Patent: May 12, 2015

(54) HIGH RATE, LONG CYCLE LIFE ELECTROCHEMICAL ENERGY STORAGE DEVICES

(75) Inventors: Mauro Pasta, Ubiale Cianezze (IT);
Colin Wessells, Eugene, OR (US);
Robert A. Huggins, Stanford, CA (US);
Yi Cui, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1 day.

(21) Appl. No.: 13/482,796

(22) Filed: May 29, 2012

(65) Prior Publication Data
US 2013/0052538 A1    Feb. 28, 2013

Related U.S. Application Data

(60) Provisional application No. 61/529,766, filed on Aug. 31, 2011.

(51) Int. Cl.
| | | |
|---|---|---|
| *H01M 4/58* | (2010.01) | |
| *H01G 9/00* | (2006.01) | |
| *H01M 4/36* | (2006.01) | |
| *H01M 4/62* | (2006.01) | |
| *H01G 11/62* | (2013.01) | |
| *H01G 11/50* | (2013.01) | |

(Continued)

(52) U.S. Cl.
CPC .............. *H01M 4/362* (2013.01); *H01G 11/62* (2013.01); *H01G 11/50* (2013.01); *H01G 15/00* (2013.01); *H01M 4/24* (2013.01); *H01M 4/62* (2013.01)

(58) Field of Classification Search
CPC ..... Y02E 60/122; Y02E 60/128; Y02E 60/13; H01M 4/0101; H01M 4/136; H01M 4/133; H01M 4/1393; H01M 4/1397; H01M 4/58; H01M 4/587; H01M 4/521; H01M 233/0005
USPC ....................................... 429/218.1, 188, 209
See application file for complete search history.

(56) References Cited

U.S. PATENT DOCUMENTS 5,209,980 A      5/1993 Spindler
5,383,089 A  *  1/1995 Williams et al. .............. 361/502

(Continued)

FOREIGN PATENT DOCUMENTS

| EP | 0 086 555 |   | 8/1983 |
|---|---|---|---|
| EP | 0086555 | * | 8/1983 |

(Continued)

OTHER PUBLICATIONS

Huang et al. J. Power Sources 186 (2009) 565-569.*

(Continued)

*Primary Examiner* — Ula C Ruddock
*Assistant Examiner* — Lisa S Park Gehrke
(74) *Attorney, Agent, or Firm* — Foley & Lardner LLP; Cliff Z. Liu

(57) ABSTRACT

An electrochemical energy storage device includes a cathode, an anode, and an electrolyte disposed between the cathode and the anode. The anode includes a capacitive material as a majority component, and further includes an electrochemically active material as a minority component, such that an operating potential of the anode is configured according to a reaction potential of the electrochemically active material.

13 Claims, 16 Drawing Sheets

(51) Int. Cl.
*H01G 15/00* (2013.01)
*H01M 4/24* (2006.01)

(56) References Cited

U.S. PATENT DOCUMENTS

| | | | |
|---|---|---|---|
| 5,744,258 A * | 4/1998 | Bai et al. ........................... | 429/3 |
| 5,824,434 A | 10/1998 | Kawakami et al. | |
| 6,482,548 B2 | 11/2002 | Amatucci | |
| 6,558,846 B1 | 5/2003 | Tsushima et al. | |
| 6,645,667 B1 * | 11/2003 | Iwamoto et al. .............. | 429/126 |
| 6,824,923 B2 | 11/2004 | Che et al. | |
| 6,842,331 B1 * | 1/2005 | Kazaryan et al. ............. | 361/502 |
| 6,924,063 B2 | 8/2005 | Che et al. | |
| 7,049,032 B2 | 5/2006 | Tsushima et al. | |
| 7,443,651 B2 | 10/2008 | Ando et al. | |
| 8,308,971 B1 | 11/2012 | Bhat et al. | |
| 2002/0025449 A1 | 2/2002 | Sukamto et al. | |
| 2002/0092155 A1 * | 7/2002 | Carlson et al. ............... | 29/623.5 |
| 2002/0160257 A1 * | 10/2002 | Lee et al. ...................... | 429/130 |
| 2005/0058907 A1 * | 3/2005 | Kurihara et al. .............. | 429/232 |
| 2007/0298253 A1 | 12/2007 | Hata et al. | |
| 2008/0143906 A1 | 6/2008 | Allemand et al. | |
| 2008/0145761 A1 | 6/2008 | Petrat et al. | |
| 2008/0276987 A1 | 11/2008 | Flood | |
| 2009/0004569 A1 | 1/2009 | Yamamoto et al. | |
| 2009/0035662 A1 | 2/2009 | Scott et al. | |
| 2009/0087742 A1 | 4/2009 | Martinet et al. | |
| 2009/0188697 A1 | 7/2009 | Guiheen et al. | |
| 2009/0317720 A1 | 12/2009 | Richard | |
| 2010/0028766 A1 | 2/2010 | Peckerar et al. | |
| 2011/0097624 A1 | 4/2011 | Bhatt et al. | |
| 2011/0104534 A1 | 5/2011 | Wei et al. | |
| 2011/0206998 A1 | 8/2011 | Song et al. | |

FOREIGN PATENT DOCUMENTS

| | | |
|---|---|---|
| EP | 0 949 702 | 8/2003 |
| WO | WO-2006/109909 | 10/2006 |

OTHER PUBLICATIONS

Cui et al. Nano Lett. 23 (2011) 5421-5425.*
An et al., "Polypyrrole/carbon aerogel composite materials for supercapacitor," Journal of Power Sources 195: 6964-6969 (2010).
Cui, et al., "Electrochemical preparation, characterization and application of electrodes modified with hybrid hexacyanoferrates of copper and cobalt", Journal of Electroanalytical Chemistry, 526: 115-124, (2002).
Search Report from PCT/US2012/043621 dated Feb. 1, 2013.
Search Report from PCT/US2012/043624 dated Jan. 21, 2013.
Grabner, E.W., et al., "Hexacyanoferrate layers as electrodes for secondary cells," J. Appl. Electrochem., 1987, vol. 17, pp. 653-656.
Honda, K., et al., "Prussian Blue Containing Nafion Composite Film as Rechargeable Battery," J. Electrochem. Soc., Jun. 1987, vol. 134, No. 6, pp. 1330-1334.
Jayalakshimi, F., et al., "Charge-discharge characteristics of a solid-state Prussian blue secondary cell," Journal of Power Sources, 2000, vol. 87, pp. 212-217.
Jayalakshimi, F., et al., "Performance characteristics of zinc hexacyanoferrate/Prussian blue and copper hexacyanoferrate/Prussian blue solid state secondary cells," Journal of Power Sources, 2000, vol. 91, pp. 217-223.
Kalwellis-Mohn, S., et al., "A Secondary Cell Based on Thin Layers of Zeolite-like Nickel Hexacyanometallates," Electrochimica Acta, 1989, vol. 34, No. 8, pp. 1265-1269.

Kaneko, M., et al., "A secondary battery composed of multilayer Prussian Blue and its reaction characteristics," J. Electroanal. Chem., 1988, vol. 255, pp. 45-52.
Neff, V.D., "Some Performance Characteristics of a Prussian Blue Battery," J. Electrochem. Soc., Jun. 1985, vol. 132, No. 6, pp. 1382-1384.
Tung, T., et al., "An indium hexacyanoferrate-tungsten oxide electrochromic battery with a hybrid K+/H+-conducting polymer electrolyte," Solid State Ionics, 2003, vol. 165, pp. 257-267.
Wang, G.J., et al., "An aqueous rechargeable lithium battery based on doping and intercalation mechanisms," J Solid State Electrochem, 2010, vol. 14, pp. 865-869.
Whitacre, J.F., et. al., "Na4Mn9O18 as a positive electrode material for an aqueous electrolyte sodium-ion energy storage device," Electrochemistry Communications, 2010, vol. 12, pp. 463-466.
Bocarsly, et al., "Effects of surface structure on electrode charge transfer properties", J. Electroanal. Chem., 140: 167-172, (1982).
Eftekhari, et al., "Potassium secondary cell based on Prussian blue cathode", Journal of Power Sources, 126: 221-228, (2004).
Kim, et al., "Polypyrrole/carbon composite electrode for high-power electrochemical capacitors", Electrochimica Acta, 52: 1727-1732, (2006).
Sinha, et al., "Reaction of nickel electrode surfaces with Aniomic metal-cyanide complexes: Formation of precipitated surfaces", Inorganic Chemistry, vol. 23, No. 2, pp. 203-212, (1983).
Kulesza et al., "Hybrid Metal Cyanometallates, Electrochemical Charging and Spectrochemical Identity of Heteronuclear Nickel/Cobalt Hexacyanoferrate," J. Electrochem. Soc. 146 (1999) 3757-3761.
Kwon et al., "Effects of Fe Doping on the Electrochemical Performance of LiCoPO4/C Composites for High Power-Density Cathode Materials," Electrochem. Comm. 11 (2008) 137-140.
Malik et al., "Quartz Crystal Microbalance Monitoring of Mass Transport During Redox Processes of Cyanometallate Modified Electrodes: Complex Charge Transport in Nickel Hexacyanoferrate Films," Electrochim. Acta 45 (2000) 3777-3784.
Stillwell, et al., "Electrochemical Studies of the Factors Influencing the Cycle Stability of Prussian Blue Films," J. Appl. Electrochem. 22 (1992) 325-331.
US Office Action Dtd Nov. 5, 2013.
U.S. Appl. No. 61/495,318, filed Jun. 9, 2011, Vinay Bhat.
Buser, et al., "The Crystal Structure of Prussian Blue: Fe4[Fe(CN)6]3*xH2O", Inorganic Chemistry, 16:11, (1977) pp. 2704-2710.
International Preliminary Report on Patentability for International Application No. PCT/2012/043621 dated Dec. 23, 2013.
Itaya et al., "Spectroelectrochemistry and Electrochemical Preparation Method of Prussian Blue Modified Electrodes", J. Am. Chem. Soc., 104 (1982) pp. 4767-4772.
Orman et al., "Cobalt(III) Lithium Oxide, CoLiO2: Structure Refinement by Powder Neutron Diffraction", Acta Cryst., C40, (1984), pp. 12-14.
Padhi, A.K. et al., "Phospho-olivines as Positive-Electrode Materials for rechargeable Lithium Batteries," J. Electrochem. Soc., vol. 144, No. 4, Apr. 1997, pp. 1188-1194.
Pau et al., "Application of Stokes' Law to Ions in Aqueous Solution", J. Phys. Chem., 94, (1990), pp. 2671-2679.
Smith et al., "A Molecular Dynamics Simulation Study of LiFePO4/Electrolyte Interfaces: Structure and Li Transport in Carbonate and Ionic Liquid Electrolytes", Phys. Chem. Chem. Phys., 11, (2009), pp. 9884-9897.

* cited by examiner

HIGH RATE, LONG CYCLE LIFE ELECTROCHEMICAL ENERGY STORAGE DEVICES

CROSS-REFERENCE TO RELATED APPLICATION

This application claims the benefit of U.S. Provisional Application Ser. No. 61/529,766, filed on Aug. 31, 2011, the disclosure of which is incorporated herein by reference in its entirety.

FIELD OF THE INVENTION

The invention generally relates to electrochemical energy storage devices and, more particularly, electrode materials for electrochemical energy storage devices.

BACKGROUND

To a large extent, recent research and development on battery technology has involved work on various versions of lithium-ion systems, and has been focused on small- to medium-scale applications, such as portable electronics and vehicle propulsion. Much less attention has been given to energy storage problems related to the large scale electrical power grid, despite costly transient outages, a rapidly growing need for frequency regulation, and the necessity for load balancing in concert with the integration of intermittent energy sources such as solar and wind. Instead of emphasizing large values of energy density and specific energy, these grid-scale energy storage applications demand high durability (e.g., long cycle life), high short term power output (e.g., high rate), and low cost.

Current solutions to address short term, high power requirements include traditional lead-acid batteries and certain advanced battery technologies. However, lead-acid batteries have insufficient cycle life and typically cannot withstand deep discharge. Common metal hydride/nickel batteries, which have excellent cycle life, are considered to be too expensive for use on a large scale, as are the sodium/sulfur and lithium-ion systems. In addition, these battery technologies typically show significant voltage hysteresis, and thus have reduced round-trip energy efficiencies when operated at high rates.

It is against this background that a need arose to develop the electrode materials and related methods and systems described herein.

SUMMARY

One aspect of the invention relates to an electrochemical energy storage device. In one embodiment, the device includes a cathode, an anode, and an electrolyte disposed between the cathode and the anode. The anode includes a capacitive material as a majority component, and further includes an electrochemically active material as a minority component, such that an operating potential of the anode is configured according to the reaction potential of the electrochemically active material.

In another embodiment, the device includes a first electrode, a second electrode, and an aqueous electrolyte disposed between the first electrode and the second electrode. At least one of the first electrode and the second electrode is configured as a hybrid electrode including a capacitive material and an electrochemically active material, and a weight percentage of the electrochemically active material is no greater than 40% relative to a combined weight of the electrochemically active material and the capacitive material in the hybrid electrode. The device is configured for charging to a voltage greater than 1.2 V.

In a further embodiment, the device includes a first capacitive electrode, a second capacitive electrode, and an electrolyte disposed between the first capacitive electrode and the second capacitive electrode. The first capacitive electrode includes a first additive configured to undergo a Faradaic reaction at a first reaction potential, and the second capacitive electrode includes a second additive configured to undergo a Faradaic reaction at a second reaction potential different from the first reaction potential.

Other aspects and embodiments of the invention are also contemplated, including aspects and embodiments related to methods of manufacturing and operating the batteries described herein. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
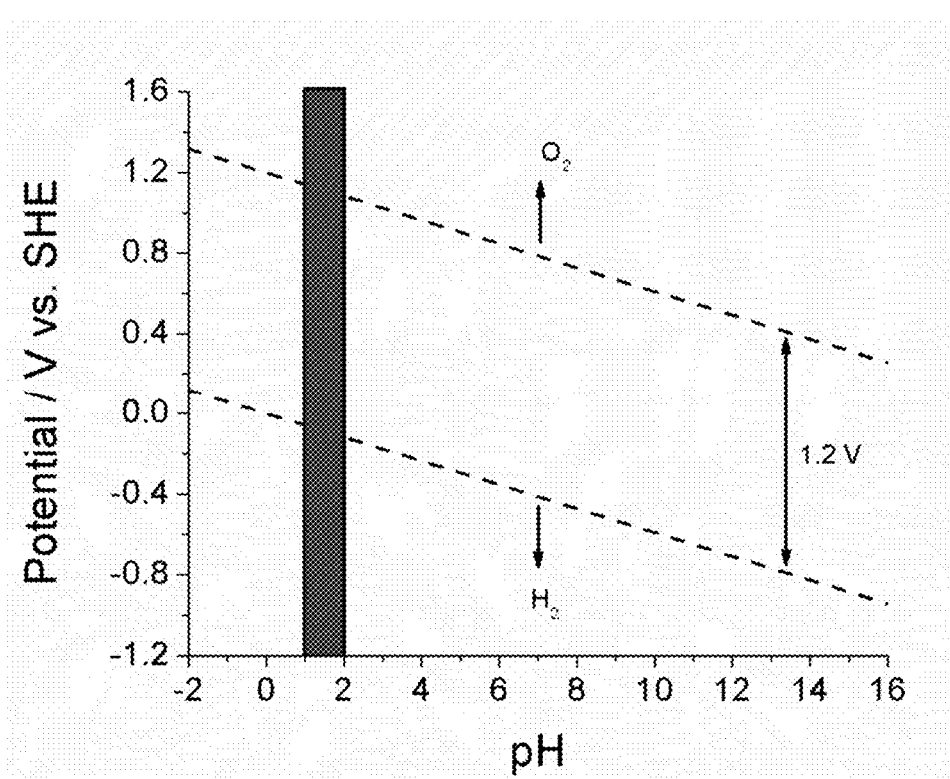
FIG. 1 shows plots of the theoretical potential ranges of hydrogen evolution and oxygen evolution of water as a function of pH, according to an embodiment of the invention.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Hybrid Electrodes

Embodiments of the invention relate to a hybrid electrode including a combination or mixture of at least one capacitive material and at least one electrochemically active material. In some embodiments, the capacitive material is a primary or majority component, and the electrochemically active material is a secondary or minority component that is included as an additive. The inclusion of the capacitive material as the majority component retains or enhances desirable properties of the capacitive material, including high rate capability and long cycle life, while the inclusion of the electrochemically active material yields a synergistic effect that allows control over an operating potential of the hybrid electrode. Specifically, by including the electrochemically active material that has a reaction potential in a desired range, the operating potential of the hybrid electrode takes on, or is shifted towards, that reaction potential, thereby allowing lowering or raising of the operating potential of the hybrid electrode. Such control over the operating potential of the hybrid electrode, in turn, allows for a higher overall voltage for an electrochemical energy storage device, such as a higher full cell voltage in the case of a battery or a higher working voltage in the case of a capacitor.

To motivate some embodiments of the invention, portions of the following discussion pertain to aqueous (i.e., water-based) electrolyte batteries, although it should be understood that the discussion also applies, or can be extended, to other types of electrochemical energy storage devices, including organic (i.e., organic solvent-based) electrolyte and ionic liquid (i.e., ionic liquid solvent-based) electrolyte batteries and capacitors, such as ultracapacitors, supercapacitors, or electric double-layer capacitors.

The development of a negative electrode (i.e., anode) material for use in aqueous electrolyte batteries is a challenging task, as the anode material should exhibit requisite levels of cyclability and chemical stability in the presence of water. Moreover, an operating potential range of an anode is bounded or constrained by a range of hydrogen evolution of water, as well as a range of oxygen evolution of water. FIG. 1 plots the range of hydrogen evolution of water as a function of pH, as denoted by a lower potential boundary at or below which there is a thermodynamic drive towards electrolyte decomposition via hydrogen evolution, and the range of oxygen evolution of water as a function of pH, as denoted by an upper potential boundary at or above which there is a thermodynamic drive towards electrolyte decomposition via oxygen evolution. For example, in the case of a pH in the range of about 1 to about 2, the operating potential range of the anode can be bounded or constrained by about 1.1 V at the upper end and about −0.1 V at the lower end, versus a standard hydrogen electrode ("SHE"). As further explained below, certain capacitive materials can impart kinetic barriers against gas evolution, and, therefore, can be operated at voltages beyond the thermodynamic boundaries shown in FIG. 1. Moreover, similar boundaries or constraints in an operating potential range are applicable for other types of electrolytes, such as organic electrolytes.

Certain capacitive electrode materials can exhibit requisite levels of cyclability and chemical stability in the presence of water. One example is a polarizable carbon-based material such as activated carbon, which is also sometimes referred as activated charcoal. Activated carbon is a particulate form of carbon that has a high porosity, yielding a high surface area. In some embodiments, a surface area of activated carbon (or another capacitive material) can be at least about 0.5 m$^2$/g, at least about 1 m$^2$/g, at least about 5 m$^2$/g, at least about 10 m$^2$/g, at least about 20 m$^2$/g, at least about 30 m$^2$/g, at least about 40 m$^2$/g, at least about 50 m$^2$/g, or at least about 100 m$^2$/g, and up to about 200 m$^2$/g, up to about 300 m$^2$/g, up to about 400 m$^2$/g, up to about 500 m$^2$/g, up to about 1,000 m$^2$/g, up to about 1,500 m$^2$/g, or more. Rather than undergoing a Faradaic reaction, activated carbon (or another capacitive material) typically stores energy in the so-called electric double layer, and behaves like a capacitor, with a charge-discharge potential profile varying substantially linearly with a state of charge. A slope of an operating potential typically depends on a surface area of an electrode-electrolyte interface, and is typically related to a capacitance of an electrode. As a general rule of thumb, a capacitance of an electric double layer in a water-based electrolyte is about 25 $\mu$F cm$^{-2}$. For applications that do not specify a low weight, using a high mass loading of activated carbon can yield a large surface area, resulting in a desirable "flat-like" profile of the operating potential.

Because cycling of activated carbon (or another capacitive material) proceeds by the formation and dispersal of a double layer of charge at an electrode surface, little or no dimensional changes occur in a bulk of the electrode material during charging and discharging, thereby affording long cycle life and high energy efficiency, as evidenced by low hysteresis in a charge-discharge potential profile. Moreover, because the double layer of charge can be reversibly and rapidly formed, activated carbon (or another capacitive material) can be operated at high rates, thereby affording high power.

Figure 2A:
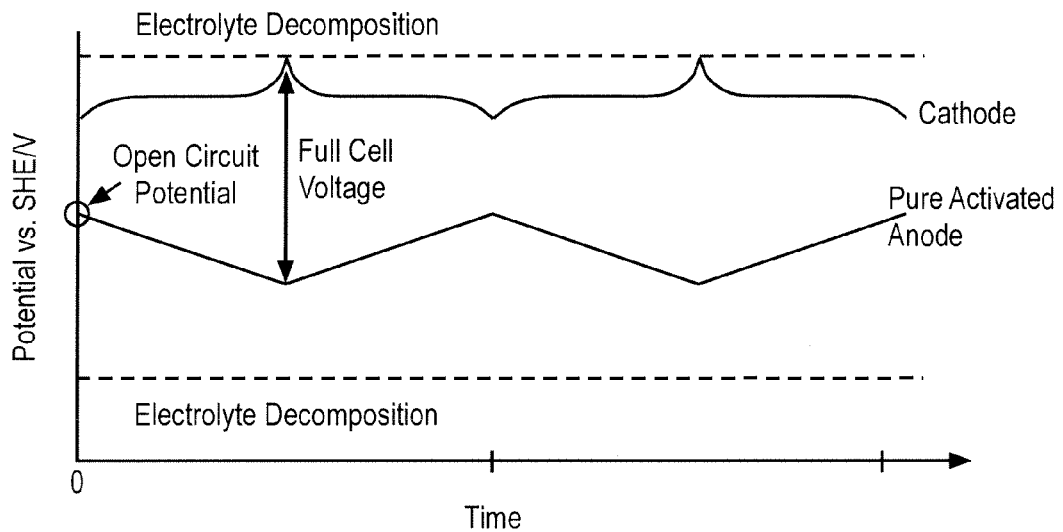
FIG. 2A shows cycling of a battery including a cathode and a pure activated carbon anode, according to an embodiment of the invention.

FIG. 2A shows cycling of a battery including a cathode and an anode including activated carbon without an additive, namely a pure activated carbon electrode. As shown in FIG. 2A, a full cell voltage of the battery is given as a difference between a cathode operating potential and an anode operating potential. A higher full cell voltage can be desirable because energy scales with voltage, and power scales with a square of the voltage. An initial, open circuit potential of a pure activated carbon anode depends on the presence of functional groups at its surface, but typically is about 0.4 V to about 0.6 V versus SHE. Specifically, the presence of oxygen-rich functional groups at the surface accounts for a hydrophilicity of the surface, which is desirable for applications in water-based electrolytes, although the presence of these groups also results in a high open circuit potential. Such a high open circuit potential results in a high anode operating potential during cycling, which, in turn, constraints or lowers a full cell voltage that is attainable. To enhance the attainable full cell voltage (and enhance the attainable energy and power), the anode operating potential should be lowered while accounting for a lower electrolyte decomposition potential at a particular pH, such as a hydrogen evolution potential at a particular pH in the case of an aqueous electrolyte.

To achieve these objectives, a general procedure is developed for the control of an open circuit potential and an operating potential of capacitive electrodes, such as those based on activated carbon. By including an electrochemically active material having a reaction potential in a desired range, an open circuit potential of the resulting hybrid electrode is shifted towards that reaction potential, such that the hybrid electrode cycles in the desired range. Advantages of this general procedure include one or both of the following:

1) The initial, open circuit potential of the hybrid electrode can be set to a desired value. In turn, setting the open circuit potential of the hybrid electrode allows control over an operating potential of the hybrid electrode during cycling. In the case of an anode, for example, the open circuit potential and the operating potential of the hybrid electrode can be lowered while remaining at or above a lower electrolyte decomposition potential at a particular pH. In such manner, a higher full cell voltage can be attained, while mitigating against electrolyte decomposition.

2) In addition to setting the open circuit potential, the inclusion of the electrochemically active material can yield a higher specific capacity for the hybrid electrode, relative to an electrode including activated carbon alone. For example, the electrochemically active material can be a battery electrode material that has a higher specific capacity than activated carbon. During cycling, the battery electrode material can contribute towards an overall specific capacity of the hybrid electrode, such as by undergoing a Faradaic reaction at its reaction potential. Compared to capacitive materials, certain battery electrode materials can have relatively constant reaction potentials during cycling. By including such a battery electrode material, the hybrid electrode can have more capacity available in a smaller potential range, relative to an electrode including activated carbon alone. Therefore, a resulting battery including the hybrid electrode can remain at higher voltages for a greater fraction of its discharge, resulting in higher energy and power outputs.

Figure 2B:
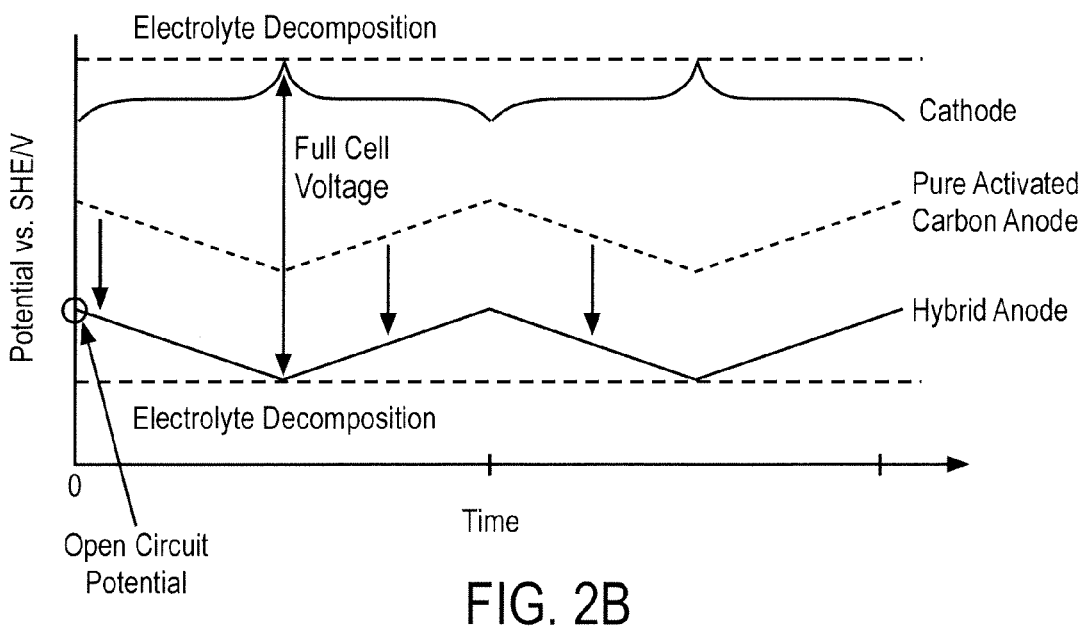
FIG. 2B shows cycling of a battery including a cathode and a hybrid anode including activated carbon and an electrochemically active material as an additive, according to an embodiment of the invention.

FIG. 2B shows cycling of a battery including a cathode and a hybrid anode including activated carbon (or another capacitive material) and an electrochemically active material as an additive. As shown in FIG. 2B, the inclusion of the additive shifts an open circuit potential and an operating potential of the hybrid anode by an amount according to a reaction potential of the additive. In the illustrated embodiment, the open circuit potential of the hybrid anode substantially corresponds to the reaction potential of the additive. Stated in another way, the hybrid anode substantially takes on an open circuit potential of the additive, although a certain offset is also contemplated for other embodiments. By selecting the additive with a desired value for its reaction potential (or its open circuit potential), an operating potential range of the hybrid anode is lowered while a lower limit of the anode operating potential range remains at or above a lower electrolyte decomposition potential at a particular pH. It is also contemplated that a certain fraction, such as a majority fraction (e.g., >0.5, ≥0.51, ≥0.55, ≥0.6, ≥0.7, ≥0.8, ≥0.9, ≥0.95, ≥0.98, or ≥0.99), of the anode operating potential range can be at or above the lower electrolyte decomposition potential, while a remaining fraction, such as a minority fraction (e.g., <0.5, ≤0.49, ≤0.45, ≤0.4, ≤0.3, ≤0.2, ≤0.1, ≤0.05, ≤0.02, or ≤0.01), of the anode operating potential range can be below the lower electrolyte decomposition potential. Although FIG. 2B shows the open circuit potential of the hybrid anode as corresponding to an upper limit of its operating potential range, the open circuit potential also can correspond to another value in that range, such as an intermediate value (e.g., a mid-point value).

Certain capacitive materials can impart kinetic barriers against gas evolution, such as by reversibly adsorbing hydrogen, rather than reducing it in an irreversible, parasitic reaction that can impair energy efficiency and cycle life of a battery. Therefore, a hybrid anode including such a capacitive material can be operated in an aqueous electrolyte at voltages below the lower thermodynamic boundary shown in FIG. 1, such as up to about 0.6 V, about 0.5 V, or about 0.4 V below the lower thermodynamic boundary at a particular pH. For example, in the case of a hybrid anode including activated carbon (or another similar capacitive material), a lower limit of its operating potential range, when cycled in an aqueous electrolyte at a pH of about 0, can be in the range of about 0.1 V to about −0.6 V versus SHE, such as from about 0 V to about −0.6 V, from about −0.05 V to about −0.6 V, from about −0.1 V to about −0.6 V, from about −0.15 V to about −0.6 V, from about −0.2 V to about −0.6 V, from about −0.2 V to about −0.5 V, or from about −0.2 V to about −0.4 V. And when cycled in an aqueous electrolyte at a pH of about 1, the lower limit of its operating potential range can be in the range of about 0.05 V to about −0.65 V versus SHE, such as from about −0.05 V to about −0.65 V, from about −0.1 V to about −0.65 V, from about −0.15 V to about −0.65 V, from about −0.2 V to about −0.65 V, from about −0.25 V to about −0.65 V, from about −0.25 V to about −0.55 V, or from about −0.25 V to about −0.45 V. And when cycled in an aqueous electrolyte at a pH of about 2, the lower limit of its operating potential range can be in the range of about 0 V to about −0.7 V versus SHE, such as from about −0.1 V to about −0.7 V, from about −0.15 V to about −0.7 V, from about −0.2 V to about −0.7 V, from about −0.25 V to about −0.7 V, from about −0.3 V to about −0.7 V, from about −0.3 V to about −0.6 V, or from about −0.3 V to about −0.5 V. And when cycled in an aqueous electrolyte at a pH of about 3, the lower limit of its operating potential range can be in the range of about −0.05 V to about −0.75 V versus SHE, such as from about −0.15 V to about −0.75 V, from about −0.2 V to about −0.75 V, from about −0.25 V to about −0.75 V, from about −0.3 V to about −0.75 V, from about −0.35 V to about −0.75 V, from about −0.35 V to about −0.65 V, or from about −0.35 V to about −0.55 V. And when cycled in an aqueous electrolyte at a pH of about 4, the lower limit of its operating potential range can be in the range of about −0.1 V to about −0.8 V versus SHE, such as from about −0.2 V to about −0.8 V, from about −0.25 V to about −0.8 V, from about −0.3 V to about −0.8 V, from about −0.35 V to about −0.8 V, from about −0.4 V to about −0.8 V, from about −0.4 V to about −0.7 V, or from about −0.4 V to about −0.6 V. And when cycled in an aqueous electrolyte at a pH of about 7, the lower limit of its operating potential range can be in the range of about −0.3 V to about −1 V versus SHE, such as from about −0.4 V to about −1 V, from about −0.45 V to about −1 V, from about −0.5 V to about −1 V, from about −0.55 V to about −1 V, from about −0.6 V to about −1 V, from about −0.6 V to about −0.9 V, or from about −0.6 V to about −0.8 V.

By lowering an operating potential of a hybrid anode in a manner as shown in FIG. 2B, a battery including the hybrid anode can be operated in an expanded full cell voltage range. In some embodiments, an aqueous electrolyte battery can be charged up to about 2.2 V (or more) versus SHE, such as up to (or beyond) about 2.1 V, up to (or beyond) about 2 V, up to (or beyond) about 1.9 V, up to (or beyond) about 1.8 V, up to (or beyond) about 1.7 V, up to (or beyond) about 1.6 V, up to (or beyond) about 1.5 V, up to (or beyond) about 1.4 V, up to (or beyond) about 1.3 V, up to (or beyond) about 1.2 V, or up to (or beyond) about 0.8 V, and can be cycled in a full cell voltage range from about 0.5 V (or less) to about 2.2 V (or more) versus SHE, such as from about 0.6 V to about 2.2 V, from about 0.7 V to about 2.2 V, from about 0.7 V to about 2.1 V, from about 0.7 V to about 2 V, from about 0.7 V to about 1.9 V, from about 0.7 V to about 1.8 V, from about 0.7 V to about 1.7 V, from about 0.7 V to about 1.6 V, from about 0.7 V to about 1.5 V, from about 0.7 V to about 1.4 V, from about 0.8 V to about 1.4 V, from about 0.9 V to about 1.4 V, from about 1 V to about 1.4 V, from about 0.7 V to about 1.3 V, from about 0.7 V to about 1.2 V, or from about 0.7 V to about 1.1 V.

The general procedure explained above also can be applied to raise an open circuit potential and an operating potential of a hybrid electrode, such as a hybrid cathode in the case of a battery or a high-potential, hybrid electrode in the case of a capacitor. Such raising of the operating potential can be carried out in place of, or in combination with, a lowering of an operating potential of a hybrid, counter electrode, such as a hybrid anode in the case of a battery or a low-potential, hybrid electrode in the case of a capacitor.

Figure 2C:
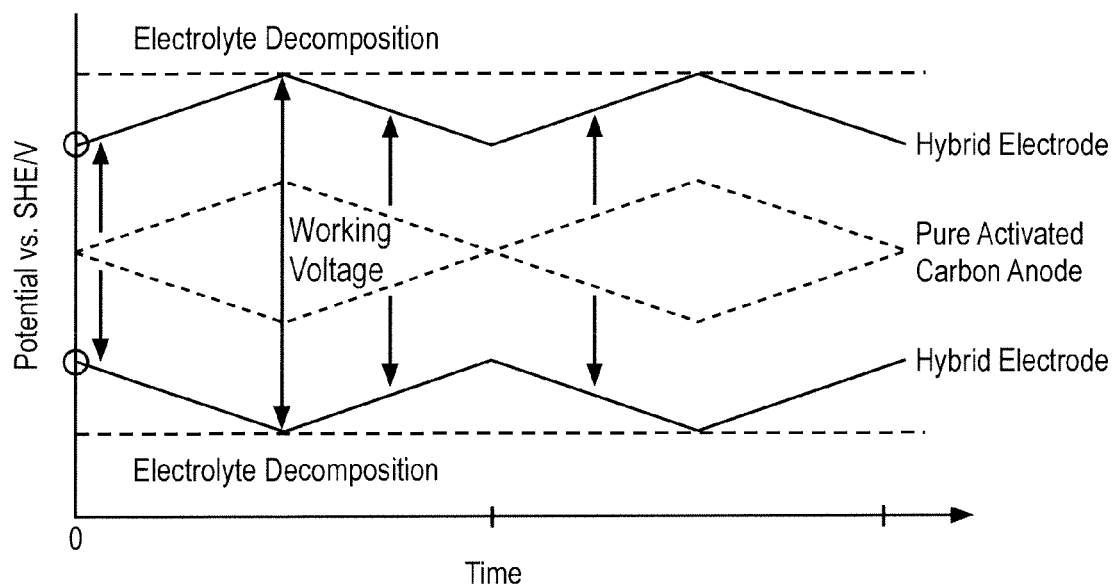
FIG. 2C shows cycling of a capacitor including a pair of hybrid electrodes each including activated carbon and an electrochemically active material as an additive, according to an embodiment of the invention.

FIG. 2C shows cycling of a capacitor including a pair of hybrid electrodes, each including activated carbon (or another capacitive material) and an electrochemically active material as an additive. As shown in FIG. 2C, the inclusion of an additive in a low-potential, hybrid electrode lowers an open circuit potential and an operating potential of the low-potential, hybrid electrode by an amount according to a reaction potential of the additive. In addition, the inclusion of an additive in a high-potential, hybrid electrode raises an open circuit potential and an operating potential of the high-potential, hybrid electrode by an amount according to a reaction potential of the additive. In the illustrated embodiment, the open circuit potential of the high-potential, hybrid electrode substantially corresponds to the reaction potential of the additive included in that hybrid electrode. Stated in another way, the high-potential, hybrid electrode substantially takes on an open circuit potential of the additive, although a certain offset is also contemplated for other embodiments. By selecting the additive with a desired value for its reaction potential (or its open circuit potential), an operating potential range of the high-potential hybrid electrode is raised while an upper limit of its operating potential range remains at or below an upper electrolyte decomposition potential at a particular pH. It is also contemplated that a certain fraction, such as a majority fraction (e.g., >0.5, ≥0.51, ≥0.55, ≥0.6, ≥0.7, ≥0.8, ≥0.9, ≥0.95, ≥0.98, or ≥0.99), of its operating potential range can be at or below the upper electrolyte decomposition potential, while a remaining fraction, such as a minority fraction (e.g., <0.5, ≤0.49, ≤0.45, ≤0.4, ≤0.3, ≤0.2, ≤0.1, ≤0.05, ≤0.02, or ≤0.01), of its operating potential range can be above the upper electrolyte decomposition potential. Although FIG. 2C shows the open circuit potential of the high-potential, hybrid electrode as corresponding to a lower limit of its operating potential range, the open circuit potential also can correspond to another value in that range, such as an intermediate value (e.g., a mid-point value).

For example, in the case of a hybrid cathode or a high-potential, hybrid electrode, an upper limit of its operating potential range, when cycled in an aqueous electrolyte at a pH of about 0, can be in the range of about 1.4 V to about 0.8 V versus SHE, such as from about 1.3 V to about 0.9 V, from about 1.2 V to about 0.9 V, or from about 1.2 V to about 1 V. And when cycled in an aqueous electrolyte at a pH of about 1, the upper limit of its operating potential range can be in the range of about 1.3 V to about 0.7 V versus SHE, such as from about 1.2 V to about 0.8 V, from about 1.1 V to about 0.8 V, or from about 1.1 V to about 0.9 V. And when cycled in an aqueous electrolyte at a pH of about 2, the upper limit of its operating potential range can be in the range of about 1.25 V to about 0.65 V versus SHE, such as from about 1.15 V to about 0.75 V, from about 1.05 V to about 0.75 V, or from about 1.05 V to about 0.85 V. And when cycled in an aqueous electrolyte at a pH of about 3, the upper limit of its operating potential range can be in the range of about 1.2 V to about 0.6 V versus SHE, such as from about 1.1 V to about 0.7 V, from about 1 V to about 0.7 V, or from about 1 V to about 0.8 V. And when cycled in an aqueous electrolyte at a pH of about 4, the upper limit of its operating potential range can be in the range of about 1.15 V to about 0.55 V versus SHE, such as from about 1.05 V to about 0.65 V, from about 0.95 V to about 0.65 V, or from about 0.95 V to about 0.75 V. And when cycled in an aqueous electrolyte at a pH of about 7, the upper limit of its operating potential range can be in the range of about 1 V to about 0.4 V versus SHE, such as from about 0.9 V to about 0.5 V, from about 0.8 V to about 0.5 V, or from about 0.8 V to about 0.6 V.

By raising and lowering operating potentials of hybrid electrodes in a manner as shown in FIG. 2C, a capacitor including the hybrid electrodes can be operated in an expanded working voltage range. In some embodiments, an organic electrolyte capacitor can be charged up to about 5 V (or more) versus SHE, such as up to (or beyond) about 4.9 V, up to (or beyond) about 4.7 V, up to (or beyond) about 4.5 V, up to (or beyond) about 4.3 V, up to (or beyond) about 4.1 V, up to (or beyond) about 3.9 V, up to (or beyond) about 3.7 V, up to (or beyond) about 3.5 V, up to (or beyond) about 3.3 V, up to (or beyond) about 3.1 V, up to (or beyond) about 3 V, up to (or beyond) about 2 V, or up to (or beyond) about 1.2 V, and can be cycled in a working voltage range from about 0.5 V (or less) to about 5 V (or more) versus SHE, such as from about 0.6 V to about 5 V, from about 0.7 V to about 5 V, from about 0.8 V to about 5 V, from about 0.9 V to about 5 V, from about 1 V to about 5 V, from about 1.5 V to about 5 V, from about 2 V to about 5 V, from about 2.5 V to about 5 V, from about 3 V to about 5 V, from about 0.7 V to about 4.9 V, from about 0.7 V to about 4.7 V, from about 0.7 V to about 4.5 V, from about 0.7 V to about 4.3 V, from about 0.7 V to about 4.1 V, from about 0.7 V to about 3.9 V, from about 0.7 V to about 3.7 V, from about 0.7 V to about 3.5 V, from about 0.7 V to about 3.3 V, or from about 0.7 V to about 3.1 V.

In accordance with the general procedure explained above, a class of hybrid electrodes is developed that affords a combination of desirable properties, including high rate capability and long cycle life, along with an operating potential that is tunable to a desired range. To attain this combination of properties, a hybrid electrode includes a combination or mixture of at least one capacitive material and at least one electrochemically active material. In some embodiments, the capacitive material is a primary or majority component, and the electrochemically active material is a secondary or minority component that is included as an additive. A content of the additive can be less than 50%, expressed as a weight percentage of the additive relative to a combined weight of the additive and the capacitive material, such as no greater than about 49%, no greater than about 45%, no greater than about 40%, no greater than about 30%, no greater than about 20%, no greater than about 15%, no greater than about 14%, no greater than about 13%, no greater than about 12%, no greater than about 11%, or no greater than about 10%, and down to about 0.1% (or less), such as down to about 0.5%, down to about 1%, down to about 2%, down to about 3%, down to about 4%, down to about 5%, down to about 6%, down to about 7%, or down to about 8%. A mass or weight ratio of the capacitive material to the additive can be greater than 1:1, such as at least about 1.5:1, at least about 2:1, at least about 3:1, at least about 4:1, at least about 5:1, at least about 6:1, at least about 7:1, at least about 8:1, at least about 9:1, or at least about 10:1, and up to about 1000:1 (or more), such as up to about 500:1, up to about 100:1, up to about 50:1, up to about 40:1, up to about 30:1, up to about 20:1, or up to about 15:1. Depending on the particular application, an optimal content of the additive can be included to attain a stable operating potential in a desired range, while retaining fast kinetics and other desirable properties afforded by the capacitive material.

In some embodiments, two or more different capacitive materials can be included in a hybrid electrode, and, alternatively, or in conjunction, two or more different additives can be included in the hybrid electrode. In such embodiments, the percentages and ratios set forth above also apply with respect to a total weight of all capacitive materials included in the hybrid electrode, and with respect to a total weight of all additives included in the hybrid electrode. For example, a total content of all additives can be less than 50%, expressed as a weight percentage of a total weight of all additives relative to a combined weight of all additives and all capacitive materials.

In addition to activated carbon, additional examples of suitable capacitive materials include graphene, carbon nanotubes (e.g., single-walled carbon nanotubes and multi-walled carbon nanotubes), carbon aerogel, nanoporous carbon, and other polarizable materials having a relatively high surface area.

Depending on the particular application, a suitable electrochemically active material can be selected for inclusion as an additive according to its reaction potential (or its open circuit potential). Specifically, a suitable electrochemically active material can undergo a Faradaic reaction with a component of an electrolyte (e.g., a cation or an anion) at a reaction potential of interest. An as-synthesized electrochemically active material can be in a substantially fully oxidized state (e.g., substantially fully doped or intercalated), and can have a reaction potential that is higher (or lower) than a desired value. In order to tune its reaction potential to the desired value, the electrochemically active material can be converted or treated into at least a fractional charge state. Such treatment can be carried out electrochemically (e.g., charging or discharging in a cell), via chemical reduction, or both.

For example, in the case of a hybrid anode to be cycled in an aqueous electrolyte at a pH of about 0, a suitable additive can have a reaction potential in the range of about 0.3 V to about −0.6 V versus SHE, such as from about 0.2 V to about −0.6 V, from about 0.15 V to about −0.6 V, from about 0.1 V to about −0.6 V, from about 0.05 V to about −0.6 V, from about 0 V to about −0.6 V, from about 0 V to about −0.5 V, or from about 0 V to about −0.4 V. And when cycled in an aqueous electrolyte at a pH of about 1, a suitable additive can have a reaction potential in the range of about 0.25 V to about −0.65 V versus SHE, such as from about 0.15 V to about −0.65 V, from about 0.1 V to about −0.65 V, from about 0.05 V to about −0.65 V, from about 0 V to about −0.65 V, from about −0.05 V to about −0.65 V, from about −0.05 V to about −0.55 V, or from about −0.05 V to about −0.45 V. And when cycled in an aqueous electrolyte at a pH of about 2, a suitable additive can have a reaction potential in the range of about 0.2 V to about −0.7 V versus SHE, such as from about 0.1 V to about −0.7 V, from about 0.05 V to about −0.7 V, from about 0 V to about −0.7 V, from about −0.05 V to about −0.7 V, from about −0.1 V to about −0.7 V, from about −0.1 V to about −0.6 V, or from about −0.1 V to about −0.5 V. And when cycled in an aqueous electrolyte at a pH of about 3, a suitable additive can have a reaction potential in the range of about 0.15 V to about −0.75 V versus SHE, such as from about 0.05 V to about −0.75 V, from about 0 V to about −0.75 V, from about −0.05 V to about −0.75 V, from about −0.1 V to about −0.75 V, from about −0.15 V to about −0.75 V, from about −0.15 V to about −0.65 V, or from about −0.15 V to about −0.55 V. And when cycled in an aqueous electrolyte at a pH of about 4, a suitable additive can have a reaction potential in the range of about 0.1 V to about −0.8 V versus SHE, such as from about 0 V to about −0.8 V, from about −0.05 V to about −0.8 V, from about −0.1 V to about −0.8 V, from about −0.15 V to about −0.8 V, from about −0.2 V to about −0.8 V, from about −0.2 V to about −0.7 V, or from about −0.2 V to about −0.6 V. And when cycled in an aqueous electrolyte at a pH of about 7, a suitable additive can have a reaction potential in the range of about −0.1 V to about −1 V versus SHE, such as from about −0.2 V to about −1 V, from about −0.25 V to about −1 V, from about −0.3 V to about −1 V, from about −0.35 V to about −1 V, from about −0.4 V to about −1 V, from about −0.4 V to about −0.9 V, or from about −0.4 V to about −0.8 V.

As another example, in the case of a hybrid cathode to be cycled in an aqueous electrolyte at a pH of about 0, a suitable additive can have a reaction potential in the range of about 1.4 V to about 0.6 V versus SHE, such as from about 1.3 V to about 0.7 V, from about 1.2 V to about 0.7 V, or from about 1.2 V to about 0.8 V. And when cycled in an aqueous electrolyte at a pH of about 1, a suitable additive can have a reaction potential in the range of about 1.3 V to about 0.5 V versus SHE, such as from about 1.2 V to about 0.6 V, from about 1.1 V to about 0.6 V, or from about 1.1 V to about 0.7 V. And when cycled in an aqueous electrolyte at a pH of about 2, a suitable additive can have a reaction potential in the range of about 1.25 V to about 0.45 V versus SHE, such as from about 1.15 V to about 0.55 V, from about 1.05 V to about 0.55 V, or from about 1.05 V to about 0.65 V. And when cycled in an aqueous electrolyte at a pH of about 3, a suitable additive can have a reaction potential in the range of about 1.2 V to about 0.4 V versus SHE, such as from about 1.1 V to about 0.5 V, from about 1 V to about 0.5 V, or from about 1 V to about 0.6 V. And when cycled in an aqueous electrolyte at a pH of about 4, a suitable additive can have a reaction potential in the range of about 1.15 V to about 0.35 V versus SHE, such as from about 1.05 V to about 0.45 V, from about 0.95 V to about 0.45 V, or from about 0.95 V to about 0.55 V. And when cycled in an aqueous electrolyte at a pH of about 7, a suitable additive can have a reaction potential in the range of about 1 V to about 0.2 V versus SHE, such as from about 0.9 V to about 0.3 V, from about 0.8 V to about 0.3 V, or from about 0.8 V to about 0.4 V.

As a further example, in the case of a hybrid cathode or a high-potential, hybrid electrode to be cycled in an organic electrolyte, a suitable additive can have a reaction potential in the range of about 0.5 V (or less) to about 5 V (or more) versus SHE, such as from about 0.6 V to about 5 V, from about 0.7 V to about 5 V, from about 0.8 V to about 5 V, from about 0.9 V to about 5 V, from about 1 V to about 5 V, from about 1.5 V to about 5 V, from about 2 V to about 5 V, from about 2.5 V to about 5 V, from about 3 V to about 5 V, from about 0.7 V to about 4.9 V, from about 0.7 V to about 4.7 V, from about 0.7 V to about 4.5 V, from about 0.7 V to about 4.3 V, from about 0.7 V to about 4.1 V, from about 0.7 V to about 3.9 V, from about 0.7 V to about 3.7 V, from about 0.7 V to about 3.5 V, from about 0.7 V to about 3.3 V, or from about 0.7 V to about 3.1 V.

Examples of suitable additives include electronically conductive polymers that can undergo a doping/de-doping reaction with a component of an electrolyte at a desired reaction potential, such as nitrogen-containing aromatic polymers (e.g., polypyrroles, polycarbazoles, polyindoles, polyanilines, and polyazepines), sulfur-containing aromatic polymers (e.g., poly(3,4-ethylenedioxythiophene)), polythiophenes, polyfluorenes, polyphenylenes, polypyrenes, polyazulenes, polynapthalenes, polyacetylenes, and poly(p-phenylene vinylene).

Additional examples of suitable additives include lithium-ion intercalation materials that can undergo an intercalation/de-intercalation reaction with lithium ions at a desired reaction potential, such as lithium transition metal oxides (e.g., lithium manganese oxide ($LiMn_2O_4$), lithium cobalt oxide ($LiCoO_2$), lithium nickel oxide ($LiNiO_2$), lithium titanium oxide ($Li_4Ti_5O_{12}$), $LiCo_{1/3}Ni_{1/3}Mn_{1/3}O_2$, and $Li(Li_aNi_xMn_yCo_z)O_2$), lithium transition metal phosphates (e.g., lithium titanium phosphate ($LiTi_2(PO_4)_3$)) and lithium iron phosphate ($LiFePO_4$)), and lithium transition metal fluorophosphates (e.g., lithium iron fluorophosphate ($Li_2FePO_4F$)).

Additional examples of suitable additives include intercalation materials that can undergo an intercalation/de-intercalation reaction with other ions different from lithium ions at a desired reaction potential, such as ions having a larger crystallographic diameter than lithium ions. Such intercalation materials include sodium-ion intercalation materials, such as transition metal oxides (e.g., tungsten oxide ($WO_3$) and vanadium oxide ($V_2O_5$)) and sodium transition metal oxides (e.g., sodium manganese oxide ($Na_4Mn_9O_{18}$)), and potassium-ion intercalation materials, such as transition metal oxides (e.g., tungsten oxide ($WO_3$) and vanadium oxide ($V_2O_5$)).

Further examples of suitable additives include a class of electrochemically active materials having stiff open framework structures into which hydrated cations can be reversibly and rapidly intercalated from aqueous electrolytes or other types of electrolytes. In particular, open framework structures with the Prussian Blue-type hexacyanometallate crystal structure afford advantages including greater durability and faster kinetics when compared to other intercalation and displacement electrode materials. A general formula for this class of materials is given by:

$$A_xP_y[R(CN)_{6-w}L_w]_z \cdot (H_2O)_n \quad (I)$$

where

A corresponds to a cation that can be reversibly inserted into the crystal structure, such as selected from monovalent cations, divalent cations, and higher-valent cations;

P corresponds to a metal and, in particular, a metal cation, such as selected from monovalent metal cations, divalent metal cations, and higher-valent metal cations;

R corresponds to a metal and, in particular, a metal cation, such as selected from monovalent metal cations, divalent metal cations, and higher-valent metal cations;

CN corresponds to a cyanide group and, in particular, a cyanide anion having a valence of 1 and an oxidation state of −1, namely $CN^{-1}$;

L corresponds to a group that is optionally included to partially or fully replace $CN^{-1}$, such as selected from monovalent anions, divalent anions, and higher-valent anions;

$H_2O$ corresponds to zeolitic water that can be present in the crystal structure;

x, y, and z are related to achieve electrical neutrality according to valencies of A, P, R, CN, and L;

x≥0, such as x>0, 0<x≤2, or 0.5≤x≤1.5;

y≥0, such as y>0, 0.5≤y≤1.5, or 0.7≤y≤1.3;

z≥0, such as z>0, 0.5≤z≤1.5, or 0.5≤z≤1.1;

0≤w≤6, such as 0<w≤6; and n≥0, such as n>0.

A material given by formula (I) can include A, P, R, CN, L, and $H_2O$, such that molar ratios of A, P, $[R(CN)_{6-w}L_w]$, and $H_2O$ can be represented as $A:P:[R(CN)_{6-w}L_w]:H_2O=x:y:z:n$, molar ratios of P and $[R(CN)_{6-w}L_w]$ can be represented as $P:[R(CN)_{6-w}L_w]=y:z$, molar ratios of P and R can be represented as P:R=y:z, molar ratios of P and CN can be represented as $P:CN=y:(6-w)\cdot z$, and molar ratios of P and L can be represented as $P:L=y:w\cdot z$. In the case w=0, molar ratios of A, P, and $[R(CN)_6]$ can be represented as $A:P:[R(CN)_6]=x:y:z$, molar ratios of P and $[R(CN)_6]$ can be represented as $P:[R(CN)_6]=y:z$, molar ratios of P and R can be represented as P:R=y:z, and molar ratios of P and CN can be represented as P:CN=y:6z.

In some embodiments, a crystal structure of a material given by formula (I) is analogous to that of the $ABX_3$ perovskites, with $P^{m+}$ and $R^{n+}$ cations in an ordered arrangement upon "B" sites. The occupancy of the tetrahedrally-coordinated "A" sites in the large cages in this crystallographically porous framework can vary from x=0 to x=2, with corresponding changes in the valence of one or both of the P and R species. As a result, such a material becomes a mixed ionic-electronic conductor. The insertion of a species of appropriate size into the "A" sites can be performed electrochemically with rapid kinetics. Specifically and in view of this crystallographically porous framework, a number of different hydrated cations can readily move into and out of the "A" sites. The species that is reversibly inserted from an electrolyte also can be exchanged, thereby allowing the implementation of electrodes in hybrid-ion aqueous electrolyte batteries. In some embodiments, a reaction potential range is at least partly determined by the identities of the A, P, and R species, and therefore can be adjusted or modified by changing their identities. For example, a reaction potential can decrease with increasing Stokes ionic diameter of the A species, and can increase with an effective ionic diameter of the A species.

Figure 3:
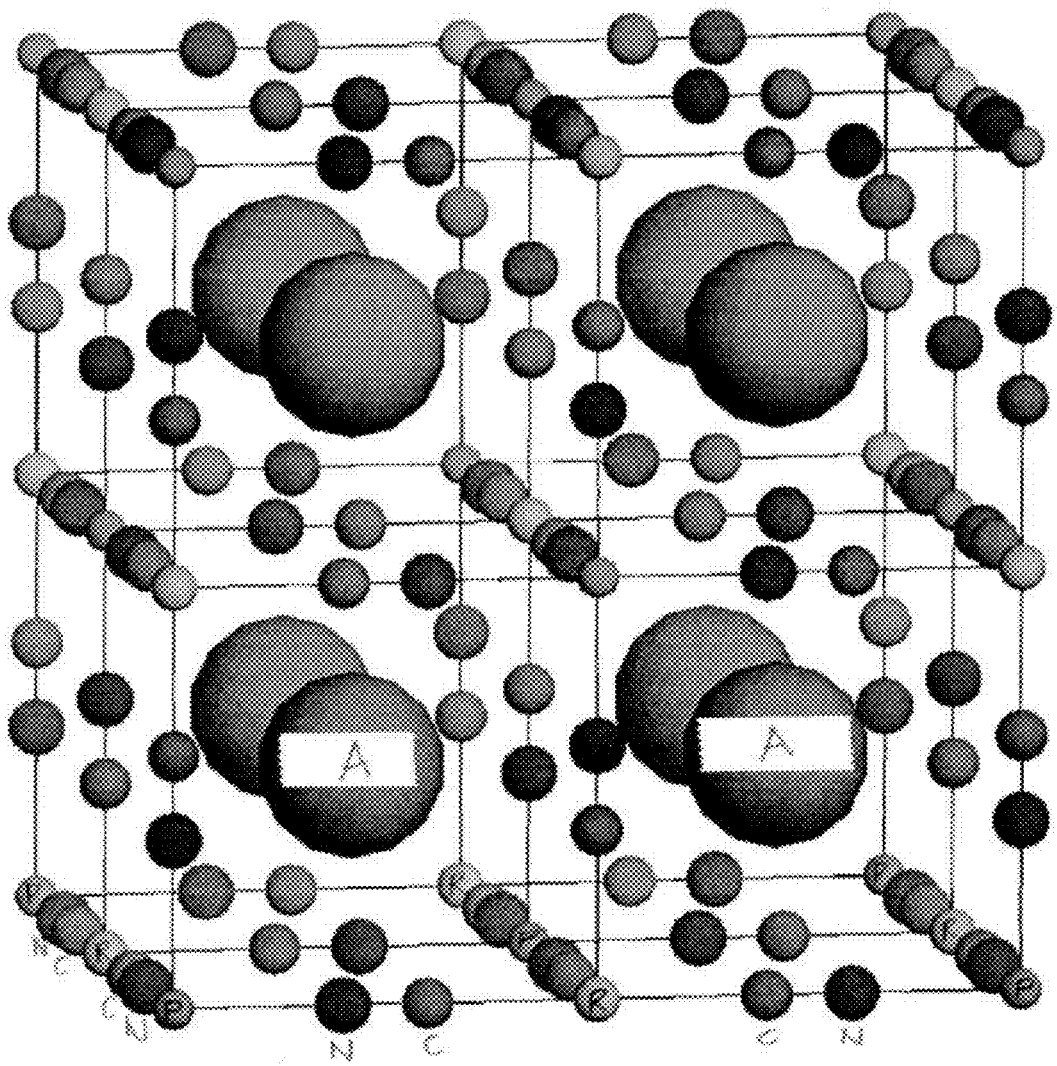
FIG. 3 shows the unit cell of a Prussian Blue crystal structure according to an embodiment of the invention.

FIG. 3 shows the unit cell of a Prussian Blue crystal structure according to an embodiment of the invention. In this structure, hexacyanometallate groups ($R(CN)_6$) form a cubic framework with six-fold nitrogen-coordinated transition metal cations (P). Relatively large interstitial sites within this open framework can host cations (A), resulting in the formula of the form $APR(CN)_6$. The relative quantities of A, P, and $R(CN)_6$ can vary from unity with defects in the framework. The channels between the interstitial "A" sites and hydrated A cations such as potassium are similar in size, allowing their rapid transport throughout the lattice. Furthermore, electrochemical cycling over a full composition range results in minimal lattice strain. Consequently, electrode materials with this type of crystal structure show stable cycling for tens of thousands of cycles, with extremely high rate capability.

Referring to formula (I), examples of suitable A cations include: (1) $H^+$; (2) alkali metal cations (e.g., $Li^+$, $Na^+$, $K^+$, $Rb^+$, and $Cs^+$); (3) polyatomic, monovalent cations (e.g., $NH_4^+$); (4) alkaline earth metal cations (e.g., $Be^{2+}$, $Mg^{2+}$, $Ca^{2+}$, $Sr^{2+}$, and $Ba^{2+}$); and (5) polyatomic, divalent cations. In some embodiments, selection of a suitable A cation can be based on a size of the A cation relative to a size of interstitial sites and channels between the sites within the Prussian Blue crystal structure, which can be represented as a void having a diameter of about 3.5 Å. Because the A cation is typically hydrated in an aqueous electrolyte, it would be expected that a Stokes ionic diameter is the relevant measure of the size of the hydrated A cation, and thus a Stokes ionic diameter of about 3.5 Å is expected to represent an upper size limit for the A cation. Surprisingly, certain materials given by formula (I) also can accommodate A cations having a Stokes ionic diameter greater than 3.5 Å, albeit having an effective ionic diameter (e.g., a crystallographic diameter or other measure of size in the substantial absence of hydration) within, or no greater than, about 3.5 Å. Examples of A cations having a Stokes ionic diameter greater than 3.5 Å include $Li^+$, $Na^+$, $Mg^{2+}$, $Ca^{2+}$, and $Ba^{2+}$. The flexibility in accommodating such A cations affords a number of advantages, such as in terms of the selection of a desired reaction potential range and improved kinetics, as well as facilitating the implementation of hybrid-ion aqueous electrolyte batteries and affording cost advantages. Selection of a suitable hydrated A cation also can be based on a size of the A cation relative to a size of channels between interstitial sites.

Still referring to formula (I), examples of suitable P and R metal cations include: (1) cations of transition metals, such as top row (or row 4) transition metals (e.g., Ti, Va, Cr, Mn, Fe, Co, Ni, Cu, and Zn), row 5 transition metals (e.g., Y, Zr, Nb, Mo, Tc, Ru, Rh, Pd, Ag, and Cd), and other transition metals; (2) post-transition metals (e.g., Al, Ga, In, Sn, Tl, Pb, and Bi); (3) metalloids (e.g., B, Si, Ge, As, Sb, Te, and Po); and (4) lanthanides (e.g., La and Ce). In some embodiments, selection of a suitable P metal cation can be based on the metal cation having the capability to take on different oxidation states. Top row (or row 4) transition metals are examples of metals that can take on a variety of oxidation states. In some embodiments, selection of a suitable R metal cation can be based on the metal cation having the capability to take on different oxidation states, chemical stability of the hexacyanometallate group $R(CN)_6$, or a combination of these considerations. Fe, Mn, Cr, and Co are examples of metals that form stable hexacyanometallate groups. Examples of suitable L anions include monovalent anions, such as polyatomic, monovalent anions (e.g., $NO^-$ and $CO^-$). In some embodiments, selection of a suitable L anion can be based on chemical stability of its bonding with the R metal cation within the group $[R(CN)_{6-w}L_w]$.

Additional examples of suitable cations for A, P, and R can be categorized in terms of their valency and include: (1) monovalent cations (e.g., $Ag^+$, $Cu^+$, $Li^+$, $Na^+$, $K^+$, $Hg^+$, $Tl^+$, $NH_4^+$); (2) divalent cations (e.g., $Mg^{2+}$, $Ca^{2+}$, $Sn^{2+}$, $Sr^{2+}$, $Ba^{2+}$, $Zn^{2+}$, $Cd^{2+}$, $Fe^{2+}$, $Mn^{2+}$, $Cu^{2+}$, $Ni^{2+}$, $Co^{2+}$, $Pb^{2+}$, $Cr^{2+}$, $Hg^{2+}$, $Os^{2+}$, $Pd^{2+}$, $Rh^{2+}$, $Ru^{2+}$, $Ti^{2+}$, $Th^{2+}$, and $V^{2+}$); (3) trivalent cations (e.g., $Al^{3+}$, $Bi^{3+}$, $Ce^{3+}$, $Co^{3+}$, $Cr^{3+}$, $Cu^{3+}$, $Fe^{3+}$, $In^{3+}$, $Ir^{3+}$, $La^{3+}$, $Mn^{3+}$, $Mo^{3+}$, $Nb^{3+}$, $Ni^{3+}$, $Os^{3+}$, $Rh^{3+}$, $Ru^{3+}$, $Sb^{3+}$, $Ta^{3+}$, $Ti^{3+}$, $V^{3+}$, and $Y^{3+}$); and (4) tetravalent cations (e.g., $Ce^{4+}$, $Cu^{4+}$, $Cr^{4+}$, $Fe^{4+}$, $Ge^{4+}$, $Mn^{4+}$, $Nb^{4+}$, $Ni^{4+}$, $Pb^{4+}$, $Ru^{4+}$, $Si^{4+}$, $Sn^{4+}$, $Ta^{4+}$, $Te^{4+}$, $Ti^{4+}$, $V^{4+}$, $W^{4+}$, and $Zr^{4+}$).

Specific examples of materials given by formula (I) include:

A is selected from $K^+$, $Li^+$, $Na^+$, $NH_4^+$, and $Ba^{2+}$, R is Fe, and P is selected from Fe, Cr, Mn, Co, Ni, Cu, Zn, Sn, and combinations thereof, such as Fe, Ni, Cu, and combination thereof;

A is selected from $K^+$, $Li^+$, $Na^+$, $NH_4^+$, and $Ba^{2+}$, R is Co, and P is selected from Fe, Mn, Co, Ni, Cu, Zn, and combinations thereof;

A is selected from $K^+$, $Li^+$, $Na^+$, $NH_4^+$, and $Ba^{2+}$, R is Mn, and P is selected from Fe, Mn, Co, Cu, Zn, and combinations thereof; and A is selected from $K^+$, $Li^+$, $Na^+$, $NH_4^+$, and $Ba^{2+}$, R is Cr, and P is selected from Fe, Cr, Mn, Co, Ni, and combinations thereof.

In formula (I), a mixture of different species can be included for any one or more of A, P, R, and L, such that formula (I) can be further generalized by: (1) representing A as $A_{x-a}A'_{a'}$ or $A_{x-a'-a''}\ldots A'_{a'}A''_{a''}\ldots$; (2) representing P as $P_{y-p}P'_{p'}$ or $P_{y-p'-p''}\ldots P'_{p'}P''_{p''}\ldots$; (3) representing R as $R_{1-r}R'_{r'}$ or $R_{1-r'-r''}\ldots R'_{r'}R''_{r''}\ldots$; and (4) representing L as $L_{w-l}L'_{l'}$ or $L_{w-l'-l''}\ldots L'_{l'}L''_{l''}\ldots$. In the generalized version of formula (I), the different species for A can correspond to the same chemical element with different oxidation states, different chemical elements, or a combination thereof. Likewise, the different species for each of P, R, and L can correspond to the same chemical element with different oxidation states, different chemical elements, or a combination thereof.

Various materials given by formula (I) can be synthesized using a spontaneous, bulk precipitation approach with low cost precursors, and the synthesis can be readily scaled up for applications such as grid-scale energy storage. For example, synthesis can be carried out by combining chemical precursors or other sources of A, P, R, CN, and L in an aqueous solution or another type of medium, with the precursors reacting spontaneously to form a powder product. In some embodiments, the chemical precursors can include a source of P (e.g., a salt of P) and a source of A and $R(CN)_6$ (e.g., a salt of A and $R(CN)_6$ such as $A_3R(CN)_6$). Synthesis can be carried out by co-precipitation, with substantially simultaneous dropwise addition of the precursors to a common liquid medium to maintain a substantially constant ratio of the precursors (e.g., a molar ratio of about 2:1 for the source of P and the source of A and $R(CN)_6$, or another molar ratio m:1 with m≥1, such as m>1 or m≥1.5) and to provide a consistent composition of a precipitate. Heating can be carried out, such as to a temperature above room temperature and below about 100° C. (e.g., in the range of about 40° C. to about 99° C., about 50° C. to about 90° C., or about 60° C. to about 80° C.), to yield better crystallinity in the final product, and an acid or a base also can be added to the reaction mixture to inhibit side reactions. A particular A used during synthesis can be exchanged by a different A' for implementation within a battery, thereby affording advantages such as the selection of a desired electrode potential range.

The resulting powder product can include particles having a grain size (e.g., an average or median grain size) no greater than about 10 μm, no greater than about 5 μm, no greater than about 1 μm, no greater than about 900 nm, no greater than about 800 nm, no greater than about 700 nm, no greater than about 600 nm, no greater than about 500 nm, no greater than about 400 nm, no greater than about 300 nm, no greater than about 200 nm, or no greater than about 100 nm, and down to about 20 nm, down to about 10 nm, down to about 5 nm, or less. Without wishing to be bound by a particular theory, small grain sizes can contribute towards improved kinetics and other desirable properties, such as by affording higher surface to volume ratios.

For implementation within a battery or a capacitor, a capacitive material can be combined with an additive to form a mixture, and this mixture can be incorporated as an active material (e.g., about 90% by total weight) by mixing with a binder (e.g., about 10% by total weight) to form a slurry. Reduction of the additive to a desired charge state can occur prior, or subsequent, to forming the slurry. The resulting slurry can be deposited adjacent to a substrate, dried to form a coating, a film, or other layer adjacent to the substrate, and then assembled as a hybrid electrode. Examples of suitable binders include polyvinylidene fluoride and other types of polymeric binders. A thickness of the coating (including the active material) can be at least about 500 nm, at least about 1 μm, at least about 10 μm, at least about 20 μm, at least about 30 μm, at least about 40 μm, or at least about 50 μm, and up to about 150 μm, up to about 200 μm, up to about 300 μm, up to about 500 μm, or more. A mass loading of the active material within the resulting electrode can be at least about 500 μg/cm², at least about 700 μg/cm², at least about 1 mg/cm², at least about 2 mg/cm², at least about 3 mg/cm², at least about 4 mg/cm², or at least about 5 mg/cm², and up to about 10 mg/cm², up to about 15 mg/cm², up to about 20 mg/cm², up to about 30 mg/cm², up to about 50 mg/cm², up to about 100 mg/cm², or more.

Uses of Hybrid Electrodes

The hybrid electrodes described herein can be used for a variety of batteries, capacitors, and other electrochemical energy storage devices. For example, the hybrid electrodes can be substituted in place of, or used in conjunction with, conventional electrodes for aqueous electrolyte batteries, organic electrolyte batteries, aqueous electrolyte capacitors, and organic electrolyte capacitors.

Figure 4:
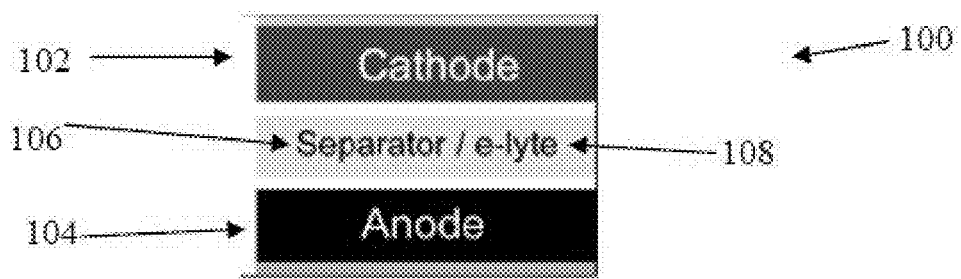
FIG. 4 shows an electrochemical energy storage device 100 implemented in accordance with an embodiment of the invention.

FIG. 4 shows an electrochemical energy storage device 100 implemented in accordance with an embodiment of the invention. The device 100 includes an electrode 102 (e.g., a cathode or a high-potential electrode), an electrode 104 (e.g., an anode or a low-potential electrode), and a separator 106 that is disposed between the electrodes 102 and 104. The device 100 also includes an electrolyte 108, which is disposed between the electrodes 102 and 104. In the illustrated embodiment, the electrolyte 108 is an aqueous electrolyte, although other types of electrolytes are contemplated. For certain implementations, the use of an aqueous electrolyte can afford a number of advantages relative to organic electrolytes, including higher safety, lower cost, capability for operation at higher power, and higher conductivity.

In the illustrated embodiment, at least one of the electrodes 102 and 104 is primarily capacitive in nature, and is formed as a hybrid electrode including a capacitive material, which is present as a majority component, and an electrochemically active material, which is present as an additive. For example, the electrode 104 can be formed as a hybrid anode, while the electrode 102 can be formed as a cathode that is primarily or substantially Faradaic in nature, such as formed using a material given by formula (I) or another electrochemically active material, with little or no capacitive material included. As another example, the electrode 102 can be formed as a high-potential, hybrid electrode including one type of additive having a relatively high reaction potential, and the electrode 104 can be formed as a low-potential, hybrid electrode including another type of additive having a relatively low reaction potential.

The inclusion of a hybrid electrode (or a pair of hybrid electrodes) in the device 100 yields a number of desirable properties, including high efficiency, long cycle life, high rate capability, and high voltage operation.

For example, in terms of round-trip energy efficiency at a rate of 10 C (or another reference rate higher or lower than 10 C, such as 0.83 C, 5 C, 8.3 C, 17 C, 42 C, 50 C, or 83 C), the device 100 can have an energy efficiency (e.g., an initial or maximum energy efficiency or an average energy efficiency over a particular number of cycles, such as cycles 1 through 100 or cycles 1 through 1,000) that is at least about 75%, at least about 80%, at least about 85%, at least about 90%, at least about 95%, or at least about 98%, and up to about 99%, up to about 99.5%, up to about 99.9%, or more.

As another example, the device 100 can exhibit excellent retention of specific capacity over several charging and discharging cycles, such that, after 1,000 cycles to full discharge at a rate of 10 C (or another reference rate higher or lower than 10 C, such as 0.83 C, 5 C, 8.3 C, 17 C, 42 C, 50 C, or 83 C), at least about 75%, at least about 80%, at least about 85%, at least about 90%, at least about 95%, or at least about 98%, and up to about 99%, up to about 99.5%, up to about 99.9%, or more of an initial or maximum specific capacity is retained, and, after 10,000 cycles to full discharge at a rate of 10 C (or another reference rate higher or lower than 10 C, such as 0.83 C, 5 C, 8.3 C, 17 C, 42 C, 50 C, or 83 C), at least about 70%, at least about 75%, at least about 80%, at least about 85%, at least about 90%, or at least about 93%, and up to about 99%, up to about 99.5%, up to about 99.9%, or more of an initial or maximum specific capacity is retained. Likewise, the device 100 can exhibit excellent retention of round-trip energy efficiency over several charging and discharging cycles, such that, after 1,000 cycles or even after 10,000 cycles to full discharge at a rate of 10 C (or another reference rate higher or lower than 10 C, such as 0.83 C, 5 C, 8.3 C, 17 C, 42 C, 50 C, or 83 C), at least about 80%, at least about 85%, at least about 90%, at least about 95%, or at least about 98%, and up to about 99%, up to about 99.5%, up to about 99.9%, or more of an initial or maximum energy efficiency is retained.

As another example, the device 100 can exhibit excellent retention of specific capacity when cycled at high rates, such that, when cycled at a rate of 10 C (or another rate that is ten times a reference rate), at least about 65%, at least about 70%, at least about 75%, at least about 80%, or at least about 85%, and up to about 90%, up to about 95%, up to about 99%, or more of a maximum specific capacity or a low rate, reference specific capacity (e.g., at the reference rate of 5 C, 1 C, 0.83 C, C/5, or C/10) is retained, and, when cycled at a rate of 50 C (or another rate that is fifty times the reference rate), at least about 15%, at least about 20%, at least about 25%, at least about 30%, or at least about 35%, and up to about 60%, up to about 70%, up to about 80%, or more of a maximum specific capacity or a low rate, reference specific capacity (e.g., at the reference rate of 5 C, 1 C, 0.83 C, C/5, or C/10) is retained. Likewise, the device 100 can exhibit excellent retention of round-trip energy efficiency when cycled at high rates, such that, when cycled at a rate of 10 C (or another rate that is ten times a reference rate), at least about 75%, at least about 80%, at least about 85%, at least about 90%, or at least about 95%, and up to about 99%, up to about 99.5%, up to about 99.9%, or more of a maximum energy efficiency or a low rate, reference energy efficiency (e.g., at the reference rate of 5 C, 1 C, 0.83 C, C/5, or C/10) is retained, and, when cycled at a rate of 50 C (or another rate that is fifty times the reference rate), at least about 60%, at least about 65%, at least about 70%, at least about 75%, or at least about 80%, and up to about 90%, up to about 95%, up to about 99%, or more of a maximum energy efficiency or a low rate, reference energy efficiency (e.g., at the reference rate of 5 C, 1 C, 0.83 C, C/5, or C/10) is retained.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Electrochemical Performance of Full Cells

This example describes an aqueous potassium-ion battery. A cathode of the device includes copper hexacyanoferrate ("CuHCF"), one of the Prussian Blue analogues that exhibit long cycle life and high rate. An anode of the device is a member of a class of hybrid electrodes that include an electrochemically active additive, which enhances the performance of a capacitive material. The particular anode reported in this example combines an electrochemically active polymer, namely polypyrrole ("PPy"), and activated carbon ("AC") in a hybrid electrode that provides the high rate capability of an ultracapacitor and a well-defined electrochemical potential of a battery electrode. The resulting full cell has high power and energy efficiency, and lasts for thousands of cycles.

Figure 5:
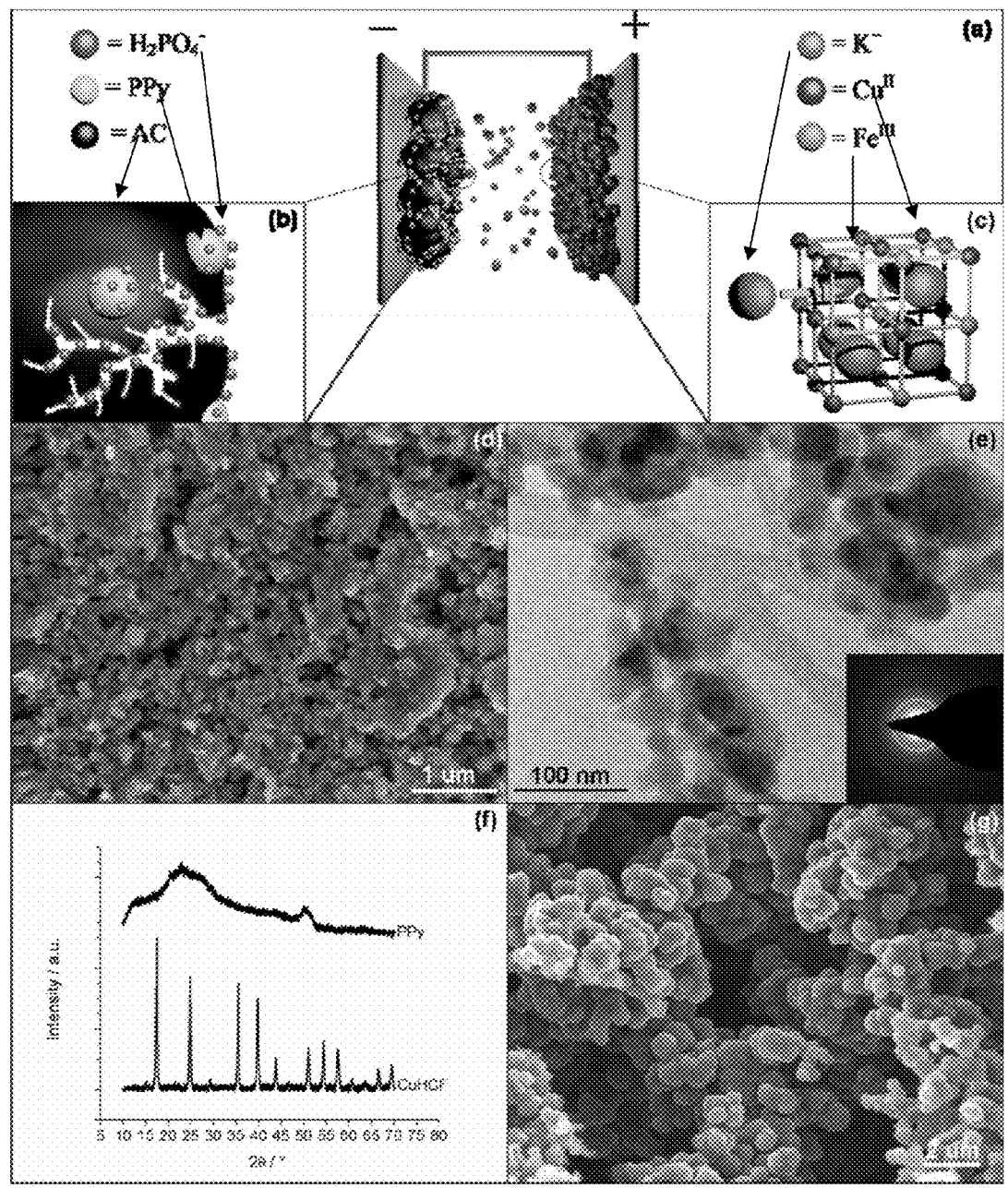
FIG. 5: (a) Schematic of a full cell device. In a polypyrrole/activated carbon negative electrode (b), a reduced polypyrrole particle fixes an open circuit potential close to a lower stability limit of an electrolyte while charge is stored in a double layer built at the high surface area activated carbon. The copper hexacyanoferrate positive electrode (c) has the open framework Prussian Blue crystal structure, in which transition metal ions are linked by a face-centered cubic framework of cyanide groups. In the case of copper hexacyanoferrate, octahedral hexacyanoferrate groups form a framework with six-fold nitrogen-coordinated copper. The framework includes large interstices, referred as "A" sites, which can include zeolitic water or mobile, hydrated alkali ions. Each of the eight subcells of the unit cell includes an "A" site that can be occupied by zeolitic water or hydrated alkali cations such as $K^+$. Hydrated ions can readily pass between one "A" site to the next through channels in the <100> directions. This three-dimensional network of "A" sites and channels allows for rapid transport of $K^+$ through the material without disturbance of the framework. Zeolitic water is omitted for clarity. Scanning Electron Microscope image (d) and Transmission Electron Microscope image (e) of copper hexacyanoferrate show polydisperse 20-50 nm particles. X-ray diffraction patterns of copper hexacyanoferrate and polypyrrole are shown in (f). Bulk synthesis of copper hexacyanoferrate at room temperature by co-precipitation results in a highly crystalline material. At 2θ=11.5° and 26°, there are two broad peaks in the pattern for polypyrrole, indicating the existence of a short range order and an ordered structure between polypyrrole chains. Scanning Electron Microscope image (g) of polypyrrole shows particles on the order of 200-400 nm size.

CuHCF has the open framework Prussian Blue crystal structure (see FIG. 5c), in which transition metal ions are linked by a face-centered cubic framework of cyanide groups. In the case of CuHCF, octahedral hexacyanoferrate groups form a framework with six-fold nitrogen-coordinated copper. The framework includes relatively large interstices, referred to as the "A" sites, which can include zeolitic water or mobile, hydrated alkali ions. During electrochemical cycling in mildly acidic aqueous electrolytes, the occupancy of the "A" sites by alkali ions varies, with a corresponding change in the valence of Fe to maintain charge neutrality. The electrochemical reaction of CuHCF with potassium ions can be represented as:

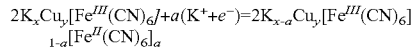

This reaction occurs at about 0.95 V (mid-composition) versus SHE, which is desirable for a cathode in mildly acidic aqueous electrolytes. Full electrochemical cycling of CuHCF results in a specific capacity of about 60 mAh/g. This reaction proceeds by the insertion of $K^+$ into the "A" sites with substantially no changes in the framework structure. Here, highly crystalline, 20-50 nm CuHCF nanoparticles (see FIG. 5d-e) were synthesized using a bulk co-precipitation method.

The use of the CuHCF cathode places certain conditions on the properties of the anode. The anode should be chemically stable in acidic solutions (pH=1-2) and should have an operating potential near −0.1 V versus SHE, the thermodynamic limit for water decomposition in this pH range. In addition, the anode should have a long cycle life and a high rate capability. The use of $K^+$ as the insertion ion for CuHCF, and its potential sensitivity to other alkali ions such as $Li^+$ and $Na^+$ place further conditions on the properties of the anode.

AC is an electric double-layer capacitor ("EDLC") electrode material that fulfills certain compatibility conditions and can be successfully paired with CuHCF. EDLCs can operate in a variety of aqueous and organic electrolytes, and can have high specific power and long cycle life. However, the cycling of an EDLC electrode typically proceeds by the physical formation and dispersal of a double layer of charge at the electrode surface, with substantially no Faradaic reaction of the bulk electrode material. This mechanism can result in a low specific capacity and deleterious self-discharge. An operating potential of a capacitive electrode can vary substantially linearly with its charge state in a steep discharge profile, so the capacitive electrode can be restricted in offering useful energy and power at shallow discharge. In addition, in the case of AC, negatively charged surface groups that improve hydrophilicity also can raise the open circuit potential ("OCP") of AC in aqueous electrolytes to above about 0.3 V versus SHE, which can be too high for a useful anode paired with a CuHCF cathode. One benefit of using AC as an anode in aqueous electrolytes is its kinetic suppression of $H_2$ evolution at low potentials, but its low specific capacity, steep discharge profile, and high OCP place restrictions on its practicality.

PPy is a member of a class of electronically conductive polymers, and includes multiple connected pyrrole ring ("Py") structures. PPy has a high theoretical specific capacity, and is very insoluble in aqueous electrolytes, which allow it to be paired with CuHCF. Electrochemical cycling of PPy proceeds by a p-type doping/de-doping reaction that can be represented as:

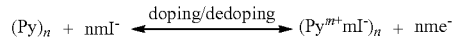

Figure 6:
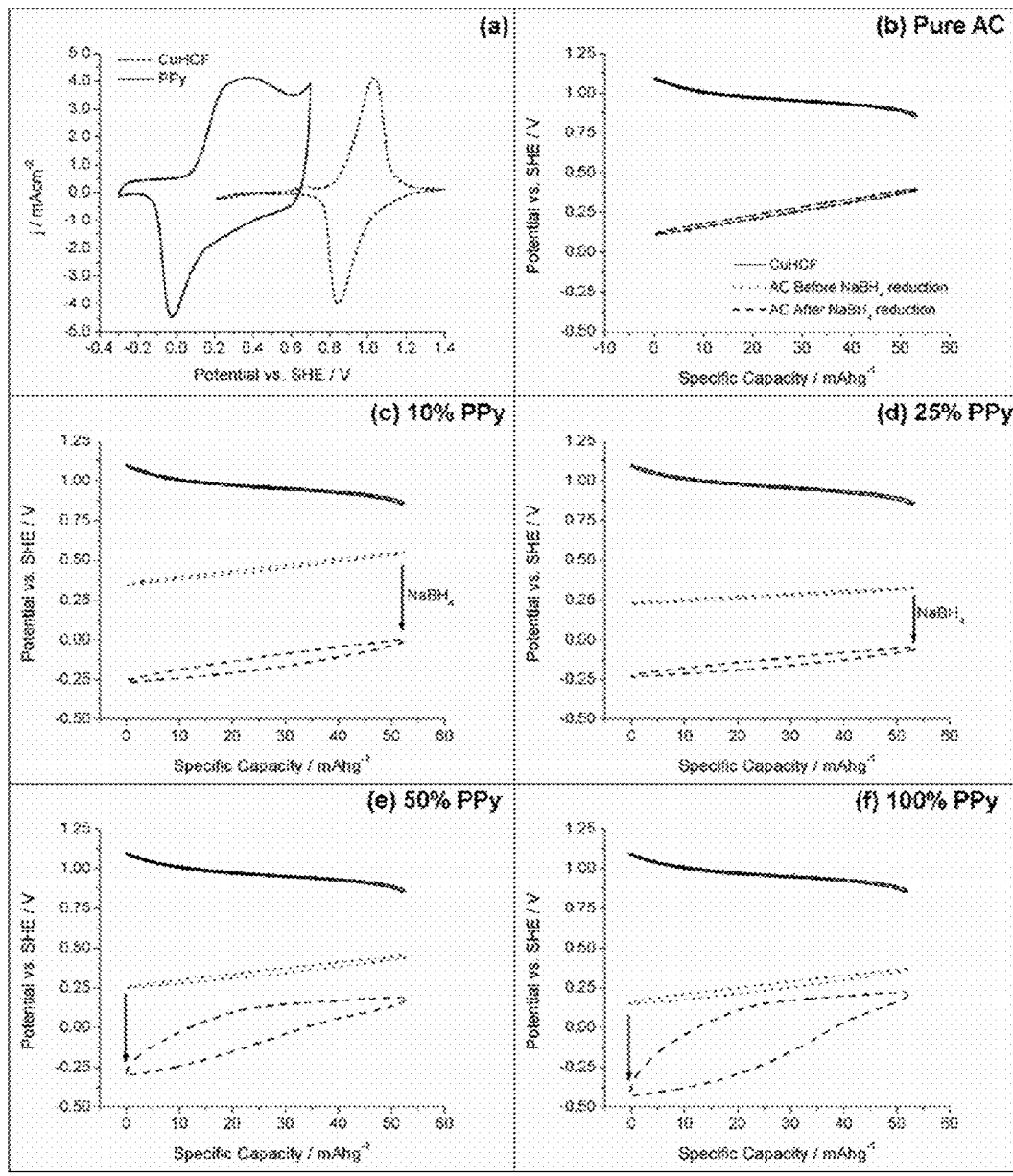
FIG. 6: (a) Cyclic voltammetries of copper hexacyanoferrate and polypyrrole at 1 mV/s scan rate; and (b-f) Galvanostatic cycling of polypyrrole/activated carbon anodes at different mass ratios of polypyrrole/activated carbon at 1 C cycle rate. Copper hexacyanoferrate cathode (—), polypyrrole/activated carbon anodes before ( . . . ) and after ( - - - ) a $NaBH_4$ chemical reduction with 0.1M $NaBH_4$.

Anions ($I^-$) from an electrolyte coordinate to PPy chains during oxidation (doping), and the anions are released during reduction (de-doping). The mid-composition reaction potential of PPy depends on the particular doping anion, but is typically near about 0 V versus SHE, making PPy desirable for use as an anode in aqueous cells (see FIG. 6a). However, its low electronic conductivity upon reduction can place restrictions on the rate capability, energy efficiency, and cycle life of a cell. Here, mildly crystalline PPy nanoparticles (see FIG. 5f-g) were synthesized by oxidative polymerization of pyrrole.

A desirable anode for use with CuHCF would combine the fast kinetics of AC at the low reaction potential of reduced (e.g., fully reduced) PPy. Advantageously, this combination of properties can be achieved by intimately mixing AC with reduced PPy in a single electrode. The resulting hybrid electrode has an OCP at the well-defined doping/de-doping potential of PPy, but retains the high rate capability of AC. Without wishing to be bound by a particular theory, this shift in OCP occurs because an OCP of AC (or another EDLC electrode material) depends on the charge state of its surface, and, as a small charge capacity is associated with that state, AC in electrical contact with a material with a well-defined redox couple will take on the potential of that couple. So, in the case of an AC/PPy hybrid electrode, the OCP of the hybrid electrode corresponds to the reaction potential of the PPy component.

As-synthesized PPy powder is fully oxidized (fully doped), and has a relatively high OCP of about 0.5 V versus SHE. An electrode including doped PPy and AC will also have a high OCP, as explained above. Using a technique for chemical reduction of PPy powder by $NaBH_4$, electrodes containing both AC and PPy were reduced, resulting in an OCP of about −0.1 V versus SHE (see FIG. 6). Chemical reduction of an AC/PPy electrode results in an OCP low enough for practical use with a CuHCF cathode. In contrast, pure AC electrodes typically do not undergo Faradaic reactions, and their OCP is not lowered by chemical reduction (see FIG. 6b).

Hybrid AC/PPy electrodes have properties intermediate between pure AC and pure PPy electrodes. As the fractional PPy content of a hybrid electrode increases, the voltage hysteresis observed during cycling at a 1 C rate increases (see FIG. 6b-f). Without wishing to be bound by a particular theory, this trend occurs because fully reduced PPy is electronically insulating. Hybrid electrodes with a PPy content as low as about 10% (weight percentage of PPy to combined weight of AC and PPy) have substantially the same low, stable OCP of a pure PPy electrode. In this example, certain AC/PPy electrodes of lower PPy content did not yield stable OCPs. An optimal PPy content was found to be about 10% because this quantity was sufficient to maintain a stable, low OCP and operating potential without impairing the high efficiency of the AC. An AC/PPy electrode including about 10% PPy was also found to have a low OCP and fast kinetics when cycled in an aqueous sodium-ion cell that included a $Na_xMnO_2$ cathode and a pH-neutral 1 M $NaClO_4$ electrolyte.

Figure 7:
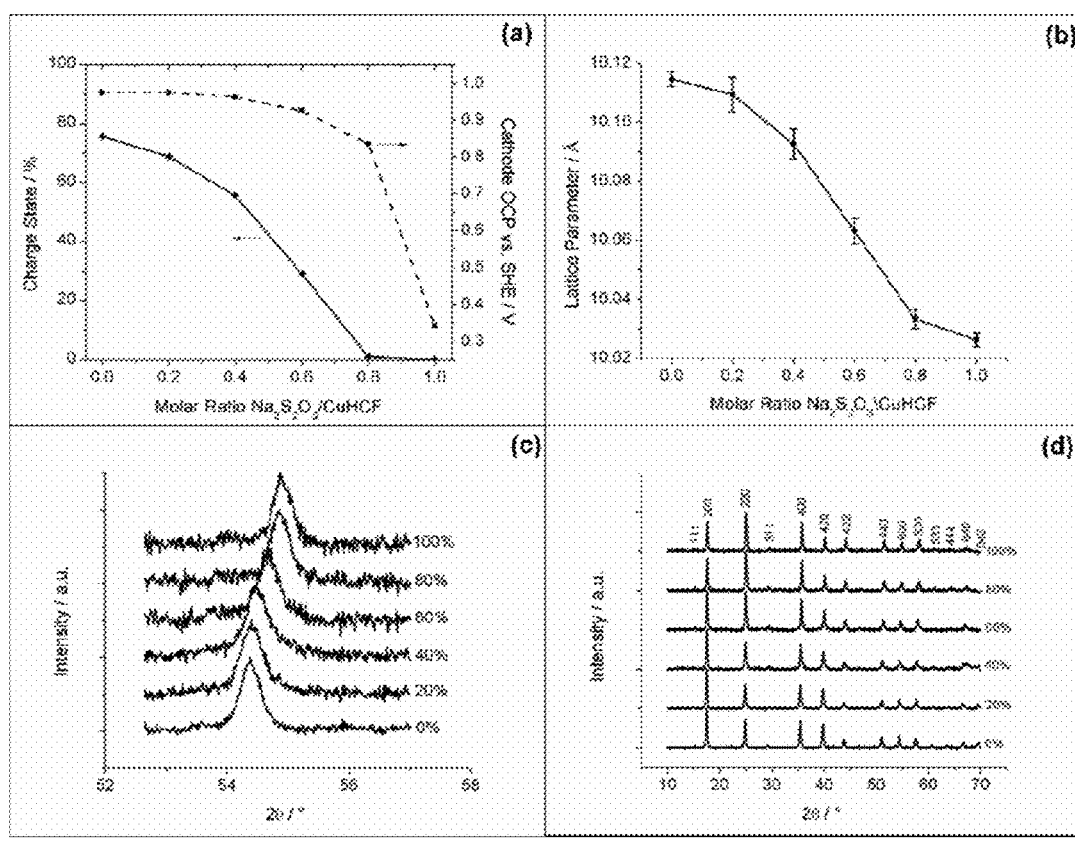
FIG. 7: (a) Charge state of copper hexacyanoferrate and cathode open circuit potential as a function of the molar ratio of sodium thiosulfate added/copper hexacyanoferrate. The decrease in the lattice parameter of copper hexacyanoferrate with chemical reduction (b) is illustrated by the shift of the 600 diffraction peak to smaller angles (c,d).

When implementing a full cell with a CuHCF cathode and an AC/PPy hybrid anode, additional considerations can be addressed. First, the two electrodes in a full cell should have appropriate relative initial charge states. The AC/PPy anode was chemically reduced so that its OCP at full discharge was substantially equal to the reaction potential of fully reduced PPy. Syntheses of CuHCF typically results in a material with a fractional initial charge state because fully oxidized CuHCF has a high enough potential that it can be reduced by water. To address this issue, a reductive titration technique was developed to controllably reduce CuHCF to a desired oxidation state and OCP using $Na_2S_2O_3$ (see FIG. 7a). In the case of full reduction of CuHCF, this reaction can be represented as:

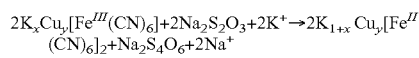

Before the addition of any $Na_2S_2O_3$, CuHCF is about 80% charged, so the addition of $Na_2S_2O_3$ in a ratio of $Na_2S_2O_3$:CuHCF of 0.8 results in full reduction. CuHCF can intercalate both $K^+$ and $Na^+$, but it reacts with $K^+$ at a higher potential than it does with $Na^+$. Though both $K^+$ and $Na^+$ are present during the reductive titration, CuHCF selectively intercalates $K^+$ because of its higher equilibrium reaction potential, and OCPs observed after chemical reduction correspond to the reaction potential of CuHCF observed at the same charge state during electrochemical cycling. Electrochemical reduction of CuHCF and other Prussian Blue analogues results in a decrease in lattice parameter, as the iron-carbon bond in $Fe(CN)_6$ shortens by about 0.05 Å during reduction. A similar decrease in the lattice parameter of CuHCF was observed during reductive titration, confirming that $K^+$ intercalation occurred (see FIG. 7b).

Another consideration for a full cell using CuHCF and AC/PPy electrodes is the disparity in the specific capacities of the electrodes. The double layer capacitance in aqueous electrolytes is typically about 10-50 $\mu F/cm^2$, so EDLCs are typically cycled over wide potential ranges to achieve appreciable capacity. However, aqueous batteries can have voltages that are restricted by water decomposition. A flat full cell voltage profile is desirable because energy scales with voltage, and power scales with the square of the voltage. If the voltage varies greatly with charge state, some of the charge is available at voltages too low to provide practical energy and power. Therefore electrodes in aqueous batteries should be cycled over relatively narrow potential ranges so that the full discharge of the devices produces usable energy. In the case of capacitive electrodes, the same charge can be accessed in a smaller potential window if a larger exposed surface, and, therefore, a larger mass is used. The CuHCF versus AC/PPy cells described here included a 10 $mg/cm^2$, 1 $cm^2$ CuHCF cathode and a 50 $mg/cm^2$, 2 $cm^2$ AC/PPy anode, resulting in a cathode/anode mass loading ratio of 1:10. Other cathode/anode mass loading ratios are contemplated, such as in the range of about 1:2 to about 1:100, such as from about 1:5 to about 1:50 or from about 1:5 to about 1:20.

A further consideration for a full cell is the electrolyte, which should be designed to allow reversible cycling of both electrodes. In the full cells reported here, CuHCF was found to be most chemically stable at pH=1.

Full cell cycling with potential cutoffs of about 0.85 V and about 1.1 V for the CuHCF cathode resulted in a full cell voltage range of about 1.4 V to about 0.9 V (see FIG. 8a,c), and a maximum specific capacity of about 54 mAh/(g of CuHCF). Because of its high mass loading, the operating potential of the AC/PPy anode changes by about 250 mV during cycling, so the changes in the operating potentials of the two electrodes contribute similarly to the slope of the full cell voltage profile. The potential hysteresis of the anode is higher than that of the cathode because of its high mass loading (50 $mg/cm^2$) and thickness (1 mm). At a 10 C rate, about 82% of the maximum specific capacity is retained, with a round trip energy efficiency of about 92% (see FIG. 8b), and, at a rate of 50 C, about 33% of the maximum specific capacity is observed at an efficiency of about 79%. Cycling was highly reversible, with essentially zero capacity loss after 1,000 cycles at a 10 C rate, and the coulombic efficiency was about 99.9% (see FIG. 8d).

The high capacity retention and rate capability of the CuHCF versus AC/PPy full cells result in high specific power. The average specific power during discharge at a 10 C rate during cycling between 1.4 V and 0.9 V was about 45 W/kg on the basis of the electrode masses, and a maximum specific power of nearly about 100 W/kg was achieved at 20 C. The specific energy of the cells reported here was about 5 Wh/kg. However, as the discharge voltage was bounded by 0.9 V, substantially all of the specific energy of the cells can be practically used. The specific power and energy of the CuHCF versus AC/PPy cells are constrained by the high mass loading of the anode. Reducing the anode mass loading by 50%, such as by using AC with a higher specific surface area, would nearly double the specific energy and power. Also, the cells reported here used a flooded geometry that resulted in electrolyte resistance. The use of pressed cells would further improve energy efficiency and specific power at high cycling rates.

Figure 8:
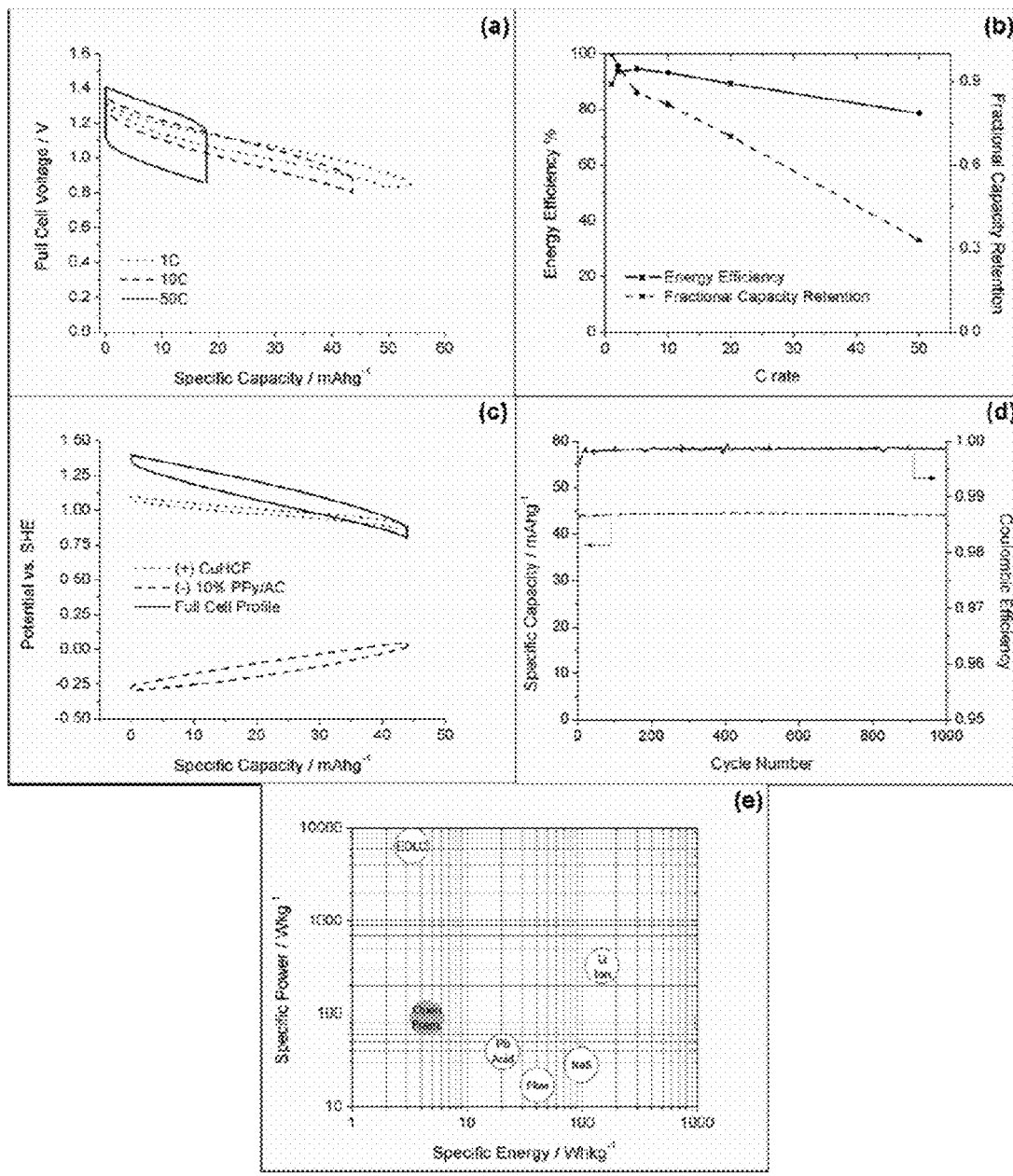
FIG. 8: (a) Full cell potential profiles at different C rates (1 C, 20 C, 50 C); (b) energy efficiency and fractional capacity retention as a function of the C rate; (c) potential profiles of copper hexacyanoferrate positive electrode, 10% polypyrrole/activated carbon negative electrode and full cell profile at 10 C; (d) cycling of the copper hexacyanoferrate-10% polypyrrole/activated carbon cell at a rate of 10 C showed essentially no capacity loss after 1,000 cycles and a coulombic efficiency up to about 99.9%; and (e) Ragone plot.

The specific power and specific energy of the CuHCF versus AC/PPy cells are compared to other battery technologies in the Ragone plot in FIG. 8e. It is observed that the cells reported here have properties intermediate between EDLCs and other batteries. Though the specific energy of a CuHCF versus AC/PPy cell is lower in comparison to certain other battery technologies, its specific power is higher than Pb-acid, NaS, and flow batteries. Stationary storage applications on the electrical grid typically specify high rate capability, long cycle life, high efficiency, and safety, but not high specific energy. Thus, the CuHCF versus AC/PPy cell is attractive for these applications.

By way of summary, aqueous potassium-ion batteries using an open framework CuHCF cathode and a controllable-potential capacitive anode were demonstrated to have long cycle life, high rate capability, and high efficiency. The CuHCF cathode is synthesized by a scalable, room-temperature chemical co-precipitation method. The anode combines AC with PPy, which can be synthesized in bulk near room temperature. The electrodes operate in safe, inexpensive aqueous electrolytes. The performance, scalability, and safety of these cells make them desirable for stationary storage applications including the smoothing of intermittent solar and wind power. The addition of electrochemically active additives with well-defined potentials to capacitive electrodes can be expanded to a wide variety of devices in which one or both of the electrodes is of the capacitive type, including devices using one or two EDLC/additive hybrid electrodes.

Experimental Procedures:

Preparation of nanoparticulate CuHCF was carried out according to a similar procedure as set forth in Wessells et al., "Copper hexacyanoferrate battery electrodes with long cycle life and high power," *Nat Commun* 2, 550 (2011), the disclosure of which is incorporated herein by reference in its entirety. Briefly, substantially equal volumes of 40 mM $Cu(NO_3)_2$ (Alfa Aesar) and 20 mM $K_3Fe(CN)_6$ (Sigma Aldrich) were combined by simultaneous, dropwise addition into water under vigorous stirring. An excess of $Cu^{+2}$ is desirable for precipitation and particle growth. Substantially all of the Fe(CN)$_6$ is oxidized initially, but fully charged CuHCF has a potential high enough to oxidize water. Thus, spontaneous partial reduction of CuHCF occurs, resulting in a fractional initial charge state, typically between 50% and 80% charged. Five minutes after complete addition of the CuHCF precursors, 0.1 M Na$_2$S$_2$O$_3$ was added until a desired molar ratio of Fe$^{III}$(CN)$_6^{-3}$ to S$_2$O$_3^{-2}$ was reached. The color of CuHCF changed from a dingy yellow to a deep claret upon addition of Na$_2$S$_2$O$_3$, indicating a successful reduction. The CuHCF was filtered, washed with water, and dried in vacuum at room temperature. Slurries including CuHCF, amorphous carbon (Super P Li), poly(vinylidene)difluoride (PVDF, Kynar HSV900), and graphite (Timcal KS6) in a mass ratio of 80:9:9:2 were prepared by grinding these materials by hand, and then dispersing them in 1-methyl-2-pyrrolidinone ("NMP"). Electrodes with mass loadings of about 10 mg/cm$^2$ CuHCF were prepared by spreading the slurry on a carbon cloth current collector (Fuel Cell Earth). The electrodes were dried in vacuum at about 60° C. for about 1 h.

PPy was prepared by chemical oxidative polymerization of its corresponding monomer (pyrrole) in an aqueous medium according to a similar procedure as set forth in Blinova et al., "Polyaniline and polypyrrole: A comparative study of the preparation," *European Polymer Journal* 43, 2331-2341 (2007), the disclosure of which is incorporated herein by reference in its entirety. Pyrrole (0.03 mol, 2 ml) was dispersed in 150 ml of de-aerated (N$_2$) cold water (0° C.). Anhydrous Na$_2$S$_2$O$_8$ (oxidant) (6.61 g, 0.03 mol) was dissolved in 50 ml of cold (0° C.) water in a reaction vessel including a magnetic stirring bar and added dropwise into the stirred pyrrole solution. The reaction was carried out for about 8 h at about 0° C. with moderate stirring. The precipitated PPy was filtered off, washed with distilled water, and dried in vacuum at about 60° C. for about 8 h. The black PPy slurries including about 10% wt./wt. PVDF and about 90% wt./wt. active material, with AC and PPy in a desired mass ratio, were prepared in NMP. Electrodes with mass loadings of about 50 mg/cm$^2$ were prepared by the procedure used for the CuHCF electrodes.

Chemical reduction of PPy was carried out by immersing the electrodes for about 20 min in a 0.1 M solution of NaBH$_4$, according to a similar procedure as set forth in Bengoechea et al., "Chemical reduction method for industrial application of undoped polypyrrole electrodes in lithium-ion batteries," *J. Power Sources* 160, 585-591 (2006), the disclosure of which is incorporated herein by reference in its entirety. The reduction can also be performed on the raw PPy powder, but may lead to material degradation if stored in air.

Flooded full cells including a CuHCF cathode, an AC/PPy anode, a 1 M potassium phosphate buffer at pH=1, and an Ag/AgCl reference electrode were prepared in a nitrogen glovebox. The AC/PPy electrode is sensitive to oxidation, so the cell should be kept oxygen free to achieve efficient anode cycling at potentials below the SHE.

Example 2

Characterization of AC/PPy Electrodes

The approach reported in this example is to use a mixture of PPy and AC in order to reduce or otherwise control an OCP of the AC. In the resulting hybrid electrode, the two materials are electrically coupled and, therefore, take on a substantially common potential: a potential of a doping/de-doping reaction of the PPy. This allows the AC to cycle at a desired potential (or within a desired potential range) by adding a non-capacitive or pseudo-capacitive contribution. Moreover, the use of AC can provide further advantages by reaching potentials below the thermodynamic value for hydrogen evolution, due to a mechanism of reversible adsorption-desorption of H atoms. The approach of using PPy is demonstrated here, and, in principle, the approach can be applied to any electrochemically active material that can be mixed with a capacitive material and galvanostatically cycled.

PPy was synthesized by modifying a procedure as set forth in Stejskal et al., "Polyaniline and polypyrrole prepared in the presence of surfactants: a comparative conductivity study," *Polymer* 44, 1353-1358 (2003), the disclosure of which is incorporated herein by reference in its entirety. Pyrrole (0.03 mol, 2 ml) was dispersed in 150 ml of de-aerated (by N$_2$ bubbling) cold water (0° C.) in a reaction vessel including a magnetic stirring bar. Anhydrous (NH$_4$)$_2$S$_2$O$_8$ (an oxidant) (6.61 g, 0.03 mol) was dissolved in 50 ml of cold (0° C.) water and added dropwise into the PPy dispersion. The reaction was carried out for about 8 h at about 0° C. (ice bath) with moderate stirring. Precipitated PPy was filtered off and washed thoroughly with cold de-ionized water. The resulting black PPy powder was dried in vacuum at about 60° C. for about 2 h. The synthesis of PPy can be modified to produce product powders of varying particle size and morphology, and varying crystallinity, by varying the temperature of the synthesis reaction, and the relative and absolute concentrations of the precursor reactants. Devices using AC/PPy electrodes have been demonstrated for a variety of PPy synthesis conditions.

Figure 9:
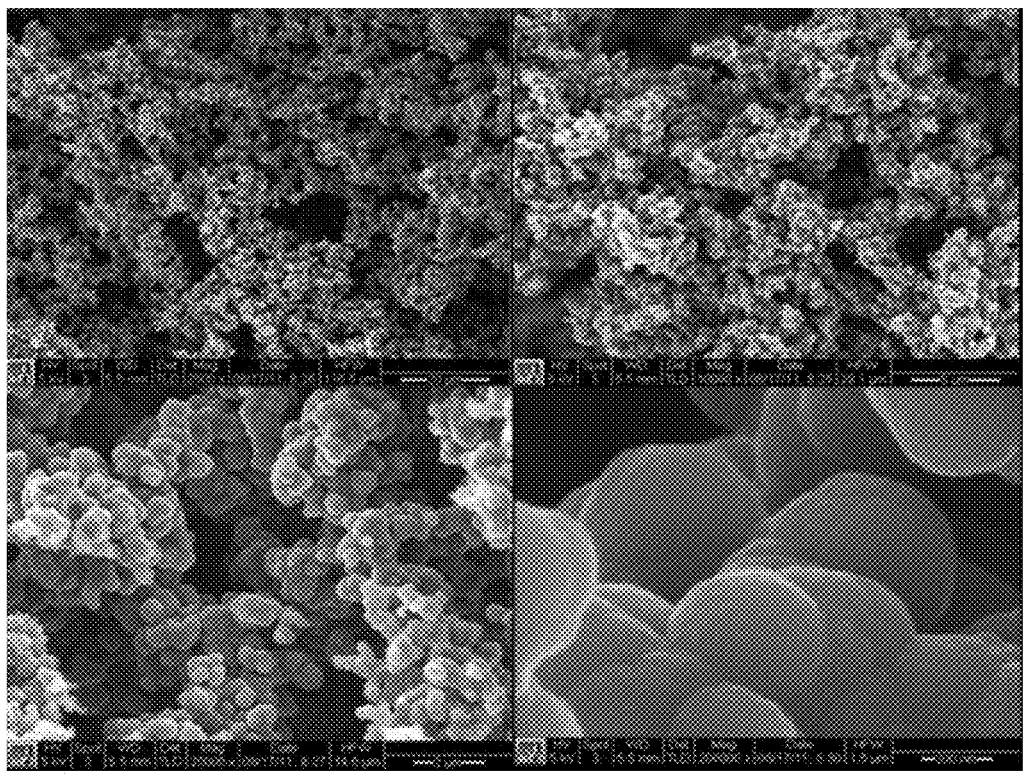
FIG. 9: Scanning Electron Microscope image of polypyrrole shows particles on the order of 300-400 nm size.
Figure 10:
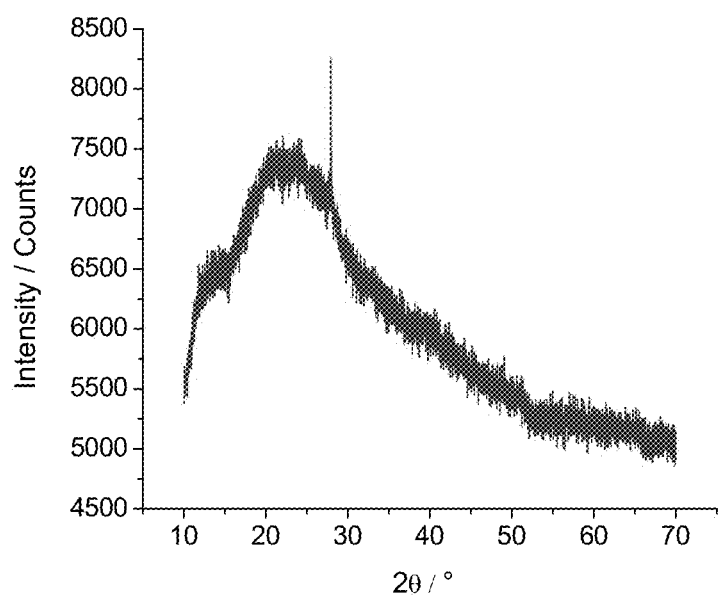
FIG. 10: X-ray diffraction pattern of polypyrrole. At 2θ=11.5° and 26°, there are two broad peaks in the pattern for polypyrrole, indicating the existence of a short range order and an ordered structure between polypyrrole chains.

FIG. 9 and FIG. 10 show a Scanning Electron Microscopy ("SEM") image and X-ray Diffraction ("XRD") pattern of the as-synthesized PPy. The sizes of the prepared PPy particles were about 300-400 nm. At 2θ=11.5° and 26°, there are two broad and overlapping peaks in the XRD pattern, indicating the existence of a short range order and an ordered structure between the PPy chains.

Figure 11:
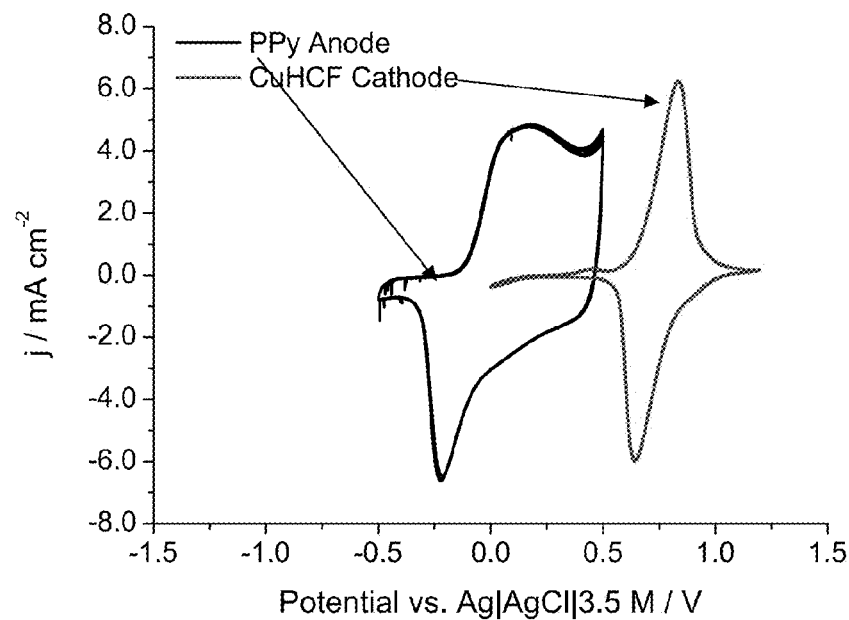
FIG. 11: Cyclic voltammetries of a copper hexacyanoferrate cathode and a polypyrrole anode.
Figure 12:
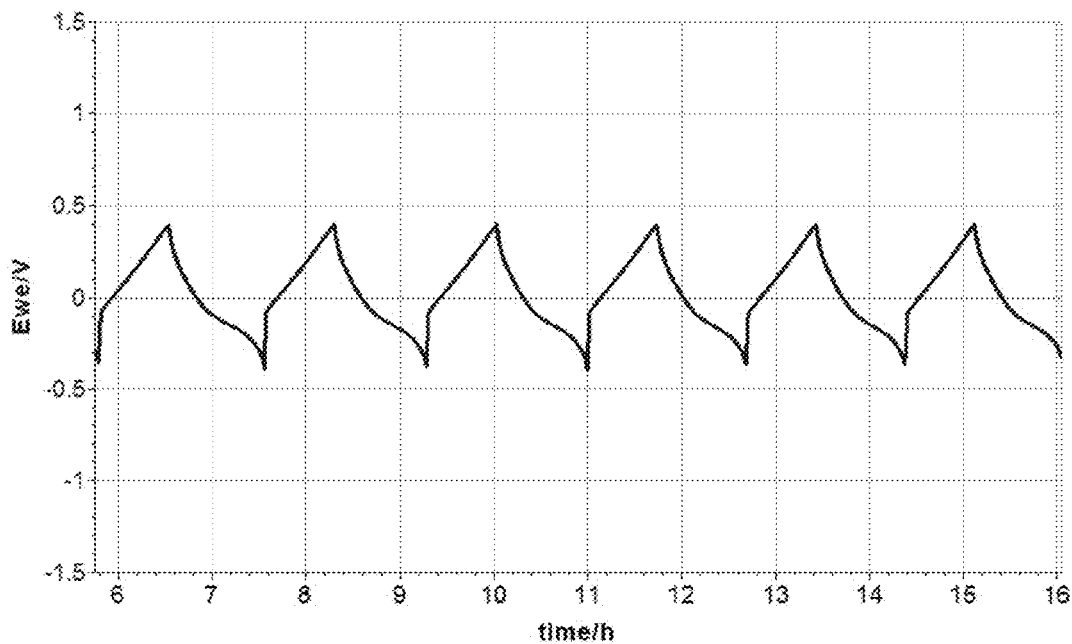
FIG. 12: Galvanostatic cycling of a polypyrrole electrode in 1M $KH_2PO_4/H_3PO_4$.

A cyclic voltammogram ("CV") of a PPy electrode prepared by drop casting an ink (80% wt./wt. PPy—10% wt./wt. PVDF—10% wt./wt. carbon black) onto a carbon cloth is shown in FIG. 11. The CV profile (along with the different shapes of the two peaks and the distance between the peaks) suggests an electrochemically process arising from the nature of the doping/de-doping reaction. This reaction is also evident in the galvanostatic potential profile of FIG. 12, which shows the results of galvanostatic cycling of the PPy electrode in a 1M KH$_2$PO$_4$/H$_3$PO$_4$ electrolyte. During charging (doping) there is about 200-300 mV jump in potential, primarily due to the lower conductivity of PPy in its undoped state, which results in a steep increase of a reaction potential due to the difficulty in placing phosphate ions in the PPy chains (doping). The discharge profile is interesting, with a plateau around −0.1 V vs. Ag|AgCl due to the de-doping process with removal of the phosphate ions from the PPy chains (de-doping).

Figure 13:
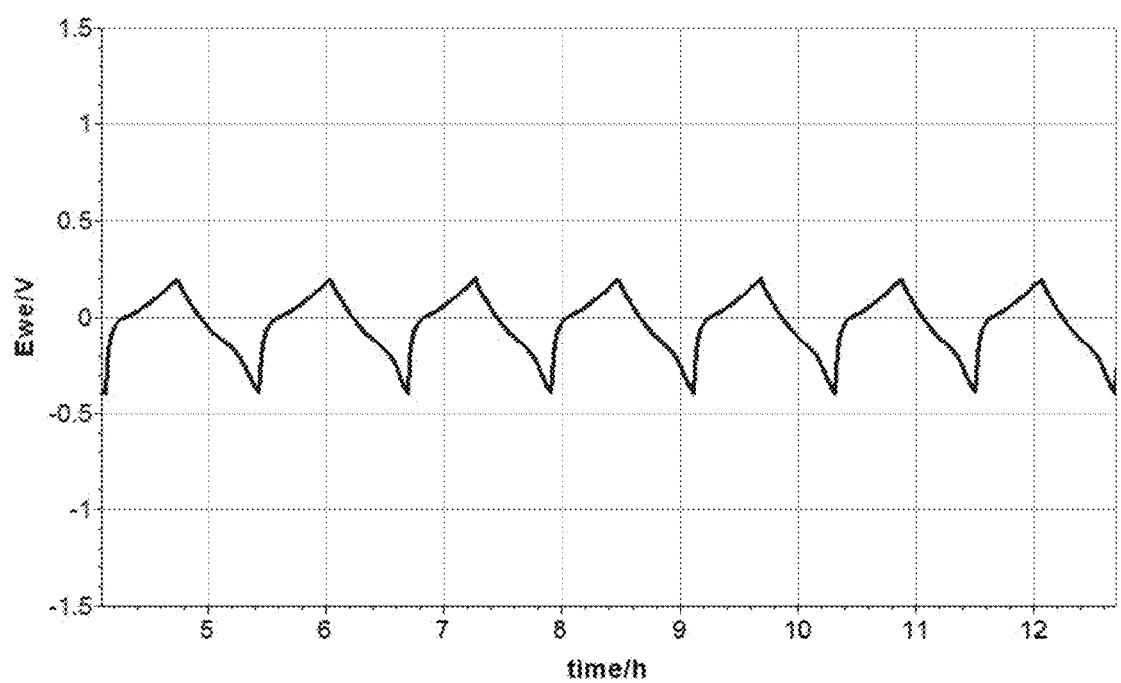
FIG. 13: Galvanostatic cycling of a 50% wt./wt. polypyrrole—43% wt./wt. activated carbon—7% wt./wt. poly(vinylidene)difluoride electrode in 1M $KH_2PO_4/H_3PO_4$.

An OCP of an AC electrode can depend on the presence of specific groups at its surface, but typically is near about 0.4 V to about 0.6 V versus SHE. Such an OCP can be too high for use as an anode in an aqueous electrolyte, because the anode operating potential should be close to a hydrogen evolution potential (e.g., about 0 V versus SHE at pH=0). A desirable anode would combine the fast kinetics of AC at the low reaction potential of PPy. In FIG. 13, the galvanostatic charge-discharge profile of a 50% wt./wt. PPy—43% wt./wt. AC—7% wt./wt. PVDF electrode is reported. The profile shows that the inclusion of PPy lowers the OCP and operating potential of the resulting hybrid electrode, and that an increase in the AC:PPy mass ratio results in improved cyclability, relative to a pure PPy electrode.

Figure 14:
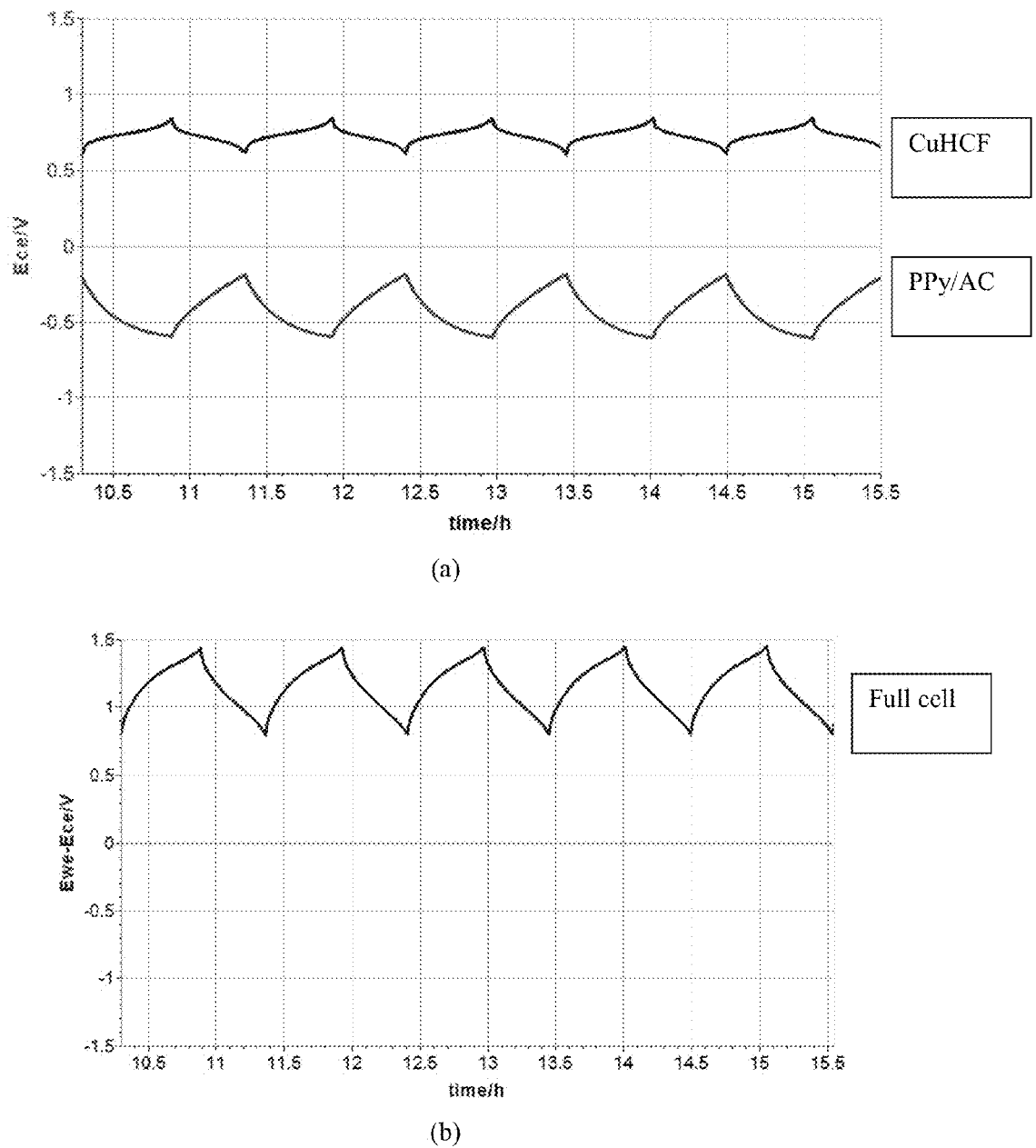
FIG. 14: (a) Charge-discharge profile of a copper hexacyanoferrate cathode (working electrode) and a 10% polypyrrole/activated carbon anode (counter electrode) in a 1M $KH_2PO_4/H_3PO_4$, pH=1 electrolyte; and (b) charge-discharge profile of the copper hexacyanoferrate-10% polypyrrole/activated carbon full cell in 1M $KH_2PO_4/H_3PO_4$, pH=1 electrolyte.

FIG. 14 shows the potential profiles of a CuHCF cathode and a hybrid anode with a PPy content of about 10% (weight percentage of PPy to combined weight of AC and PPy), as well as a full cell voltage including these electrodes. It can be observed that the full cell cycles reversibly, with no appreciable hydrogen evolution.

Example 3

Electrochemical Performance of Full Cells

Figure 15:
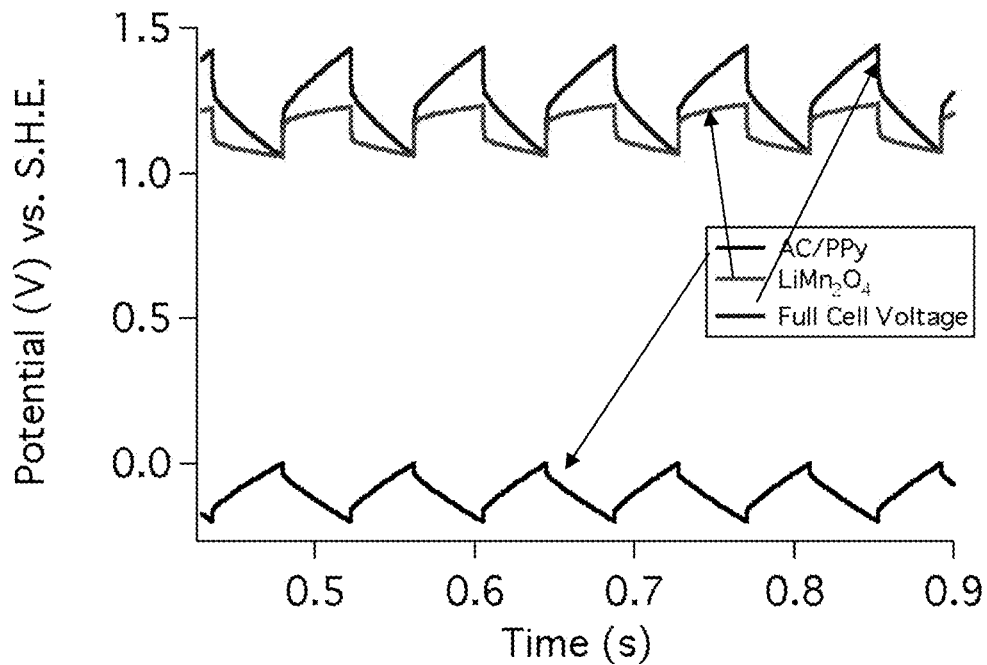
FIG. 15: Galvanostatic cycling of a full cell including a lithium manganese oxide cathode and a polypyrrole/activated carbon anode in a 6M $LiNO_3$ electrolyte.

This example demonstrates that an AC/PPy electrode can be operated against other types of electrodes, in addition to Prussian Blue analogue electrodes. Specifically, this example describes an aqueous lithium-ion battery. A cathode of the device is composed of a slurry of an electrochemically active lithium manganese oxide ($LiMn_2O_4$), carbon black, and a polymer binder, and is cycled against an AC/PPy anode in an aqueous 6 M $LiNO_3$ electrolyte at a neutral pH (pH=7). As shown in FIG. 15, the charge/discharge profile of the full cell device is highly reversible, and operates with a full cell voltage of up to about 1.5 V.

The $LiNO_3$ electrolyte in this example includes a different cation, a different anion, and a different pH than the potassium phosphate buffer used in full cells of certain other examples herein. This example demonstrates the ability to use the AC/PPy electrode in a wide variety of aqueous salt electrolytes over a wide pH range. Further, this example demonstrates that a wide variety of electrodes (e.g., open frameworks, ceramic oxides, alloys, polymers, and so forth) can be operated against AC/conductive polymer electrodes.

Example 4

Characterization of AC/Additive Electrodes

This example describes hybrid electrodes including AC and an electrochemically active material as an additive. One additive used is PPy, which is a mixed-conducting polymer. This example demonstrates the use of an AC/PPy electrode in a wide variety of batteries. In addition, this example demonstrates the use of a lithium titanium phosphate, namely $LiTi_2(PO_4)_3$ ("LTP"), as an additive in an AC/LTP electrode. Together, these implementations demonstrate the general approach of using AC/additive electrodes.

Figure 16:
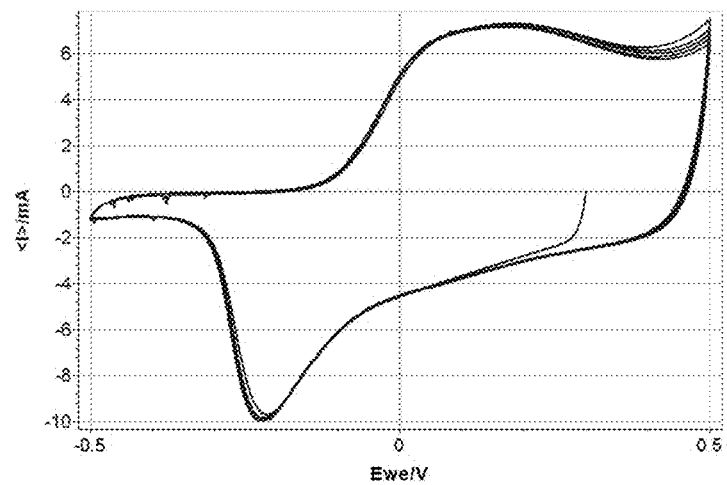
FIG. 16: Cyclic voltammetry of cold-synthesized polypyrrole at 1 mV/s. The high currents and well-defined peaks centered near 0 V versus SHE show that this material has a high capacity and a good rate capability. The electrolyte is a 1 M potassium phosphate buffer (pH=1). The open circuit potential of PPy is about 0.3 V versus SHE.

Synthesis of PPy was carried out at a relatively low temperature according to the following procedure: (1) Pyrrole (0.03 mol, 2 ml) was dispersed in 150 ml of de-aerated ($N_2$) cold water (0° C.); (2) anhydrous $Na_2S_2O_8$ (oxidant) (6.61 g, 0.03 mol) was dissolved in 50 ml of cold (0° C.) water in a reaction vessel including a magnetic stirring bar and added dropwise into the stirred oxidant solution; (3) reaction carried out for about 8 h at about 0° C. with moderate stirring; (4) precipitated PPy was filtered off and washed with cold de-ionized water; and (5) black PPy powder dried in vacuum at about 40° C. overnight to allow substantially full drying. The low temperature synthesis of PPy results in smaller particles with sizes less than about 500 nm. The smaller sizes, in turn, result in increased reactivity that improves the performance of PPy when used as an electrode. Specifically, cold-synthesized PPy shows improved electrochemical activity when used as an electrode, in comparison to PPy synthesized at room temperature. FIG. 16 shows a cyclic voltammetry scan on a cold-synthesized PPy electrode.

Figure 17:
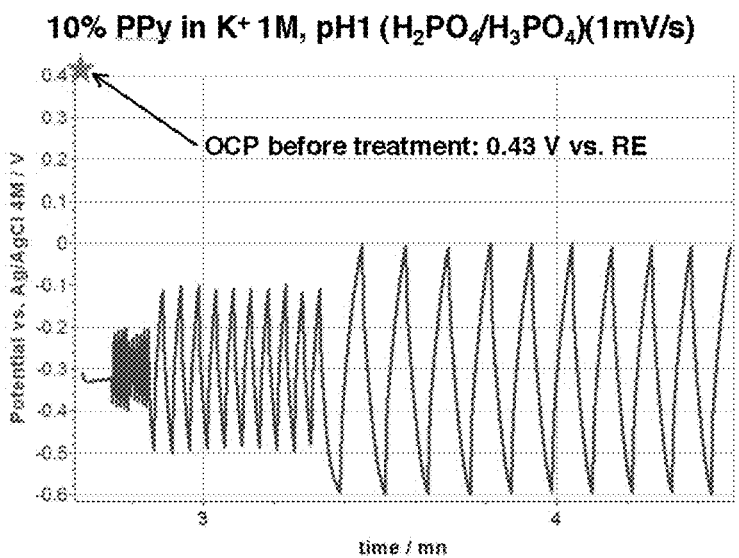
FIG. 17: Galvanostatic cycling of a 10% polypyrrole/activated carbon electrode in 1 M potassium phosphate buffer (pH=1). An open circuit potential of the electrode without chemical reduction was found to be about 0.4 V versus Ag/AgCl, while the open circuit potential of the chemically reduced electrode was about −0.3 V. The (initial) open circuit potential of the chemically reduced polypyrrole/activated carbon is low enough for it to be cycled as an anode with no electrochemical treatment.

As-synthesized PPy is fully oxidized. However, in order for PPy to impart a well-defined potential in a desired range, PPy should have a fractional charge state. Therefore, partial chemical or electrochemical reduction of the as-synthesized PPy is carried out before it is used effectively as an electrode additive. The mid-composition reaction potential of PPy is near 0 V versus SHE. Therefore, PPy can be chemically reduced using strong reducing agents such as sodium borohydride ($NaBH_4$). Electrode slurries including PPy can be prepared and then exposed to aqueous solutions including reducing agents. For example, an AC/PPy slurry on a carbon cloth current collector can be dipped in 0.1 M $NaBH_4$ to reduce the PPy component of the electrode to a desired charge state. The longer the duration of exposure to the reducing agent, the more the PPy component is typically reduced. Typical exposure times are from a few seconds to about 1 h, depending on the quantity of PPy and the quantity and strength of the reducing agent. FIG. 17 shows the effect of chemical reduction on an AC/PPy electrode with a PPy content of about 10% (weight percentage of PPy to combined weight of AC and PPy). An OCP of the electrode without chemical reduction was found to be about 0.4 V versus Ag/AgCl, while the OCP of the chemically reduced electrode was about −0.3 V versus Ag/AgCl.

Figure 18:
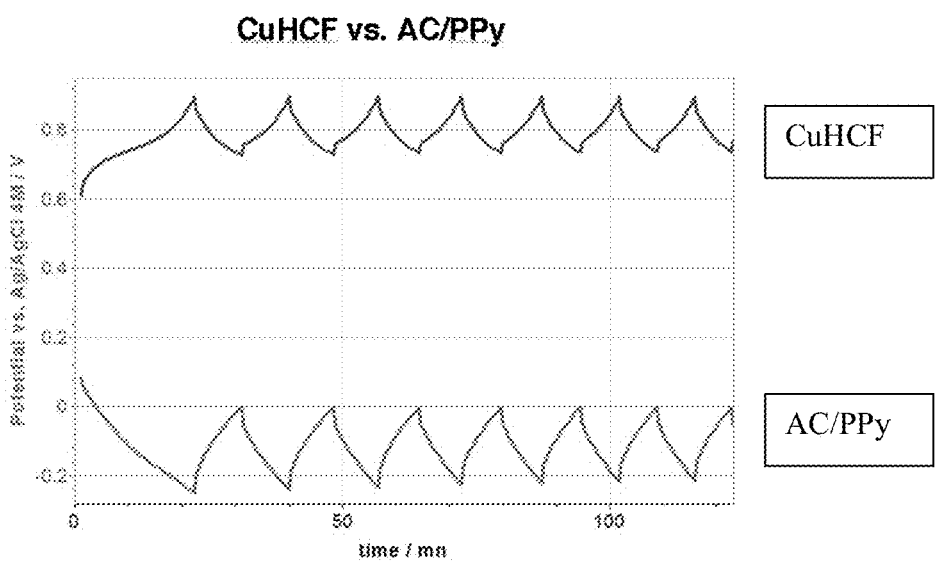
FIG. 18: Galvanostatic cycling of a copper hexacyanoferrate versus activated carbon/polypyrrole battery (current ~1 mA/cm$^2$).

A full cell was implemented with an AC/PPy anode, an aqueous potassium-ion electrolyte (1 M potassium phosphate buffer, pH=1), and a Prussian Blue analogue (CuHCF) cathode. The anode included AC/PPy in a 9:1 mass ratio, without chemical reduction treatment. FIG. 18 shows galvanostatic cycling of the full cell at a current of about 1 mA/cm², and shows reversible operation of the device.

Figure 19:
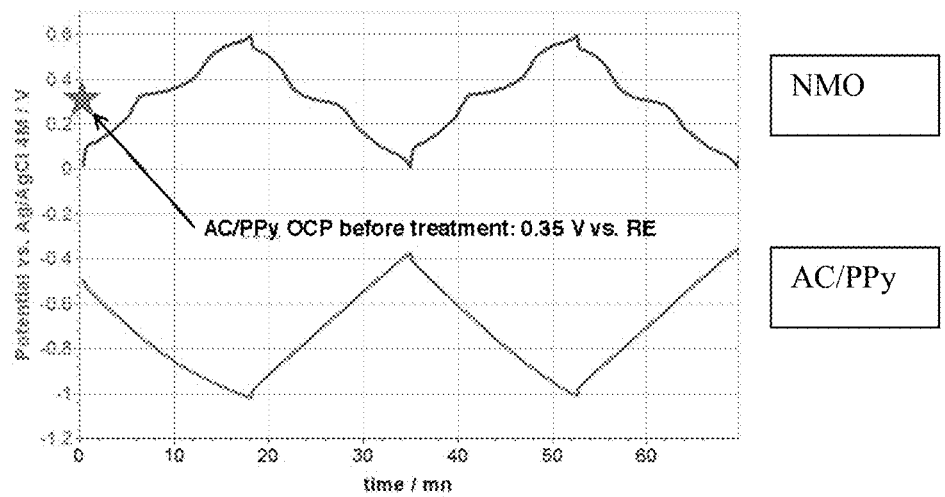
FIG. 19: Galvanostatic cycling of a sodium manganese oxide versus activated carbon/polypyrrole battery (current ~1 mA/cm$^2$). Chemical reduction of the activated carbon/polypyrrole electrode reduces its open circuit potential by about 0.7 V, allowing it to be used as an anode with no electrochemical pretreatment.

Another full cell was implemented with an AC/PPy anode, an aqueous sodium-ion electrolyte (1 M sodium perchlorate, pH=7), and a sodium manganese oxide ("NMO") cathode. The anode included AC/PPy in a 9:1 mass ratio, with chemical reduction treatment. FIG. 19 shows galvanostatic cycling of the full cell at a current of about 1 mA/cm², and shows reversible operation of the device.

Figure 20:
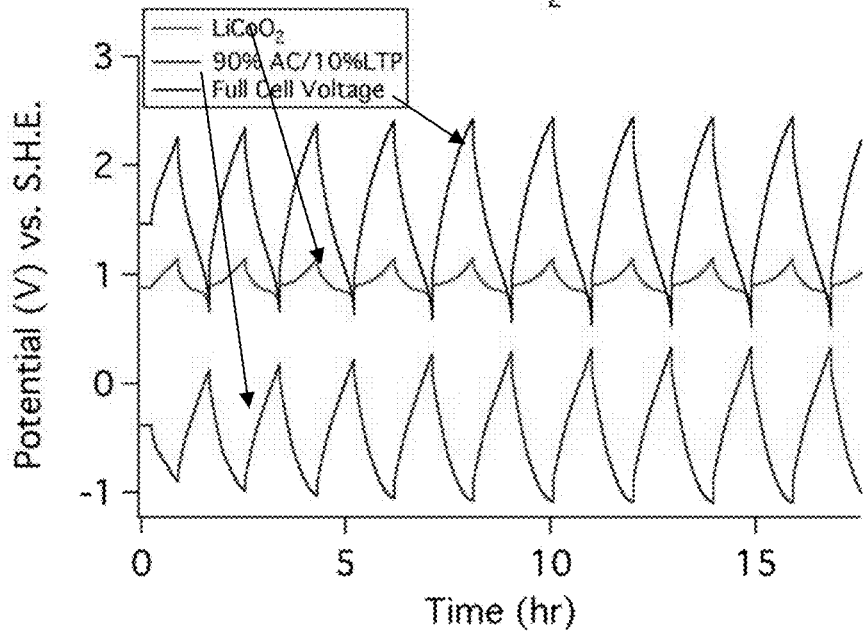
FIG. 20: Galvanostatic cycling of an aqueous lithium-ion battery including a lithium cobalt oxide cathode and an activated carbon/lithium titanium phosphate anode. Chemical reduction of the activated carbon/lithium titanium phosphate anode results in a low open circuit potential of about −0.4 V versus SHE. The activated carbon/lithium titanium phosphate anode cycles around this potential, while the lithium cobalt oxide cathode cycles near 1 V versus SHE. This results in an ultra-high voltage aqueous battery that operates at over 2 V.

Another full cell was implemented with LTP as an electrochemically active. A pure LTP anode typically suffers from poor kinetics in aqueous lithium-ion batteries, which impedes cycling at high rates. However, its mid-composition reaction potential of about −0.5 V versus SHE render it desirable as an additive. By incorporating LTP in an AC electrode, an operating potential of the resulting LTP/AC hybrid electrode will be shifted to near the reaction potential of pure LTP. Here, the full cell included a lithium cobalt oxide ($LiCoO_2$) cathode, an aqueous lithium-ion electrolyte (1 M lithium perchlorate, pH=7), and anode including AC/LTP in a 9:1 mass ratio, with partial chemical reduction of the LTP using $NaBH_4$. The resulting aqueous lithium-ion battery using the AC/LTP anode can have full cell voltages of 1.5 V or more and can operate at high rates (see FIG. 20).

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention.

Accordingly, unless specifically indicated herein, the order and grouping of the operations are not limitations of the invention.

What is claimed is:

1. An electrochemical energy storage device comprising:
   a cathode;
   an anode; and
   an aqueous electrolyte disposed between the cathode and the anode and having a pH less than 3,
   wherein the cathode includes a material having a Prussian Blue crystal structure, and
   wherein the anode includes a capacitive material as a majority component, and further includes an electrochemically active material as a minority component, such that an operating potential of the anode is configured according to a reaction potential of the electrochemically active material.

2. The electrochemical energy storage device of claim 1, wherein the operating potential of the anode is shifted by an amount according to the reaction potential of the electrochemically active material, relative to the absence of the electrochemically active material.

3. The electrochemical energy storage device of claim 2, wherein the operating potential of the anode is lowered towards a decomposition potential of the electrolyte.

4. The electrochemical energy storage device of claim 1, wherein the device is configured for charging to a voltage greater than 1.2 V.

5. The electrochemical energy storage device of claim 1, wherein the device is configured for charging to a voltage greater than 0.8 V.

6. The electrochemical energy storage device of claim 1, wherein the device is configured for charging to a voltage greater than 2 V.

7. The electrochemical energy storage device of claim 1, wherein a weight ratio of the capacitive material to the electrochemically active material is at least 2:1.

8. The electrochemical energy storage device of claim 1, wherein a weight ratio of the capacitive material to the electrochemically active material is at least 5:1.

9. The electrochemical energy storage device of claim 1, wherein a weight ratio of the capacitive material to the electrochemically active material is up to 30:1.

10. The electrochemical energy storage device of claim 1, wherein the capacitive material is a carbon-based material.

11. The electrochemical energy storage device of claim 1, wherein the electrochemically active material is an electronically conductive polymer.

12. The electrochemical energy storage device of claim 1, wherein the pH of the electrolyte is 2 or less.

13. The electrochemical energy storage device of claim 1, wherein the pH of the electrolyte is in the range of 1 to 2.

* * * * *